United States Patent

Hashimoto et al.

[11] Patent Number: 6,058,911
[45] Date of Patent: May 9, 2000

[54] FUEL CHAMBER FOR AUTOMOTIVE VEHICLE

[75] Inventors: Takashi Hashimoto; Masami Honma; Toshihide Kimisawa, all of Kanagawa-ken, Japan

[73] Assignees: Nissan Motor Co., Ltd.; Nifco Inc., both of Kanagawa-ken, Japan

[21] Appl. No.: 09/055,266

[22] Filed: Apr. 6, 1998

[30] Foreign Application Priority Data

| Apr. 7, 1997 | [JP] | Japan | 9-103960 |
| Apr. 8, 1997 | [JP] | Japan | 9-089730 |
| Apr. 8, 1997 | [JP] | Japan | 9-089731 |
| Nov. 25, 1997 | [JP] | Japan | 9-323295 |

[51] Int. Cl.$^7$ .................................................. F02M 37/04
[52] U.S. Cl. ........................................ 123/514; 123/509
[58] Field of Search .................... 123/509, 514, 123/510, 497, 516; 417/79, 80; 137/574, 576

[56] References Cited

U.S. PATENT DOCUMENTS

| 3,049,171 | 8/1962 | Neuerberg | 137/574 |
| 4,397,333 | 8/1983 | Liba | 137/574 |
| 4,838,307 | 6/1989 | Sasaki | 137/574 |
| 5,016,670 | 5/1991 | Sasaki | 123/514 |
| 5,218,942 | 6/1993 | Coha | 123/514 |
| 5,289,810 | 3/1994 | Bauer | 123/514 |
| 5,564,397 | 10/1996 | Kleppner | 123/514 |
| 5,794,597 | 8/1998 | Schwegler | 123/514 |

FOREIGN PATENT DOCUMENTS 3-225060  10/1991  Japan .

Primary Examiner—Carl S. Miller
Attorney, Agent, or Firm—McDermott, Will & Emery

[57] ABSTRACT

A fuel chamber provided in a fuel tank for an automotive vehicle in order to effectively prevent a temperature of a fuel within a fuel tank from ascending not so as to generate a vapor due to a fuel returned to the fuel chamber end from an engine is mainly disclosed. In a typical fuel chamber, a fuel chamber main body, a jet nozzle member having a front end portion inserted into a hole portion communicating an inner portion with an outer portion of the fuel chamber main body, a cover body forming a pressure reduction chamber decompressed in response to that the jet nozzle member injects a return fuel to the fuel chamber main body through the hole portion, and a tubular circulating member circulating a fuel within the fuel chamber main body are provided. The fuel stored within the fuel tank is introduced into the fuel chamber main body and the fuel within the fuel chamber main body is circulated in response to that the jet nozzle member injects the return fuel into the fuel chamber main body.

19 Claims, 21 Drawing Sheets

FUEL CHAMBER FOR AUTOMOTIVE VEHICLE

BACKGROUND OF THE INVENTION

1. Field of the Invention

The present invention relates to a fuel chamber provided in a fuel tank and preferably applied to an automotive vehicle.

2. Description of the Related Art

Conventionally, in an automotive vehicle with an electronic fuel injection apparatus, a fuel (generally a gasoline) in a fuel tank is supplied to the fuel injection apparatus by an electric fuel pump, a necessary amount of fuel is injected into a combustion chamber in an engine by the fuel injection apparatus, and an excessive fuel is returned to the fuel tank.

Accordingly, during an operation of the engine, a predetermined amount of fuel is always circulated between the fuel injection apparatus and the fuel tank, and only a necessary amount of fuel is injected to the combustion chamber of the engine among the circulated fuel.

In this case, since the fuel once returned to the engine (hereinafter, refer to a "return gasoline") becomes a significantly high temperature, a temperature of the whole gasoline within the tank is increased due to the heat of the return gasoline when the return gasoline is directly mixed into the fuel within the fuel tank, so that the gasoline is evaporated into a vapor.

Accordingly, there occur disadvantages that the gasoline increases an internal pressure of the tank, and the gasoline is wastefully consumed due to the evaporation.

Then, conventionally, a fuel chamber is provided within the fuel tank in such a manner that the gasoline within the tank can communicates, the gasoline within the fuel tank is introduced into the chamber, the gasoline within the chamber is supplied to the fuel injection apparatus by the fuel pump, and the return gasoline having a small amount of component having a high temperature but less vapor generation is returned within the chamber, so that the return gasoline having a high temperature is shut out from a fresh gasoline (having a low temperature) within the fuel tank, thereby preventing from a vaporization. Further, in order to reduce an unavailable remaining amount of the gasoline within the tank, it is performed that the fresh gasoline within the tank is sucked and introduced into the chamber by a liquid flow of the return gasoline.

However, when the fresh gasoline having a lot of vapor generating components within the tank is sucked and introduced into the chamber only by the liquid flow of the return gasoline, a temperature of the fresh gasoline is gradually increased, so that the vapor is generated from the fresh gasoline and a sufficient vapor prevention effect can not be always obtained.

Further, in accordance with a structure of the fuel chamber, there is a case that an unnecessary noise such as entrainment sound and the like is generated within the fuel chamber. In this case, an occupant feels the noise as an unpleasant sound, so that there has been a problem of injuring a quality feeling.

Still further, since the fuel chamber is disposed within the fuel tank of the automotive vehicle, a liquid surface of the fuel is changed at a time when the automotive vehicle turns, so that there have been problems that the fuel is not smoothly supplied to the fuel chamber, and that even when the fuel is once supplied into the fuel chamber, the fuel flows backward toward the fuel tank. The case, for example, that the fuel is not smoothly supplied to the fuel chamber will be described below on the basis of the substantially same structure as the structure disclosed in Japanese Patent Unexamined Laid-Open Publication No. 3-225060.

A structure of a conventional fuel chamber of this kind for an automotive vehicle is known, for example, as the structure shown in FIGS. 1 and 2.

In this structure, a fuel tank $1a$ made of a resin is provided in a fuel tank 1 for the vehicle, the fuel chamber 2 serving as a swirling tank fixed to a bottom portion $1b$ of a fuel tank main body 1 for storing a fuel.

The fuel chamber 2 is formed substantially in a box shape having a bottom and no top, and a communication opening 3 for communicating the fuel within the fuel tank 1 is formed in a peripheral wall portion $2b$.

In the communication opening 3, in order to introduce the fuel within the fuel tank 1 into the fuel chamber main body $2a$ corresponding to the storage tank for the fuel, an inlet portion of a fuel passage 5 separated from the fuel chamber main body $2a$ is constituted by a partition wall 4 having a substantially L shape in a plan view and disposed along the peripheral wall portion $2b$.

Further, an outlet portion of the fuel passage 5 is constituted by a feed-out port 6 disposed substantially in the opposite position with respect to the chamber main body $2a$ of the communication opening 3.

In the conventional fuel chamber structured in the above manner, even when the liquid surface of the fuel is inclined as shown in a two-dot chain line $a$ in FIG. 2 at a time of turning or the like, a predetermined amount of remaining fuel corresponding to substantially half the fuel chamber main body $2a$ can be secured.

Then, since the feed-out port 6 is formed at the opposite position of the communication opening 3, the fuel is prevented from being flown out from the communication opening 3 by the partition wall 4 even when the liquid surface of the fuel is inclined as shown in a two-dot chain line $b$ in FIG. 2. Therefore, amount of the fuel returning into the fuel tank main body $1a$ through the fuel passage 5 is a little, so that the predetermined amount of remaining fuel is substantially secured within the fuel chamber main body $2a$.

Accordingly, since the predetermined amount of fuel can be substantially secured even when the liquid surface of the fuel is inclined to a different direction, a pump suction port 7 faced within the fuel chamber main body $2a$ is not exposed to an open air, so that the fuel can be efficiently sucked to a portion close to a terminal end.

In the conventional structure of the chamber, in order to increase the amount of the remaining fuel within the fuel chamber main body $2a$, it is known that it is better to employ a structure for setting a predetermined amount of height d in such a manner as to make a position of the feed-out port 6 or a bottom surface $5a$ of the fuel passage 5 higher than a position of the bottom portion $2c$ of the fuel chamber main body $2a$.

When the position of the feed-out port 6 or the bottom surface $5a$ of the fuel passage 5 is set to be higher than the position of the bottom portion $2c$ of the fuel chamber main body $2a$, a lot of remaining fuel can be secured in comparison with the structure for securing the remaining fuel till a position shown in the two-dot chain line $b$ mentioned above even when the liquid surface of the fuel is inclined as shown in a two-dot chain line $c$ in FIG. 2 at a time of turning or the like.

However, when the position of the feed-out port 6 or the bottom surface $5a$ of the fuel passage 5 is set to be higher than the position of the bottom portion 2c of the fuel chamber main body 2a, there is a risk that the fuel within the fuel tank main body 1a can not flows over the bottom surface 5a of the fuel passage 5 or the feed-out port 6 at a time of reducing near the bottom portion 1b, thereby not being introduced into the chamber main body 2b.

Accordingly, even when the fuel is sucked out from the fuel chamber main body 2a, the fuel is remained within the fuel tank main body 1a, so that there is a problem that the fuel can not efficiently sucked out near the terminal end and, therefore, the fuel in the fuel tank main body 1a can not be supplied to the fuel chamber main body 2a.

SUMMARY OF THE INVENTION

An object of the present invention is to provide a fuel chamber for an automotive vehicle which can reduce a mixing between a return gasoline having a high temperature and a fresh gasoline as little as possible, can efficiently circulate the return gasoline having a high temperature so as to effectively perform a thermal separation, and can very efficiently prevent a vaporization of a gasoline due to heat of the return gasoline.

In order to achieve the object mentioned above, in accordance with the present invention, there is provided one aspect of a fuel chamber for an automotive vehicle which is provided within a fuel tank of an automotive vehicle, introduces a fuel stored within the fuel tank to an inner portion thereof, and receives a fuel returned to the fuel tank through a fuel pump. In this aspect of the fuel chamber, a chamber main body, a hole portion provided in a lower portion of the chamber main body and communicating an inner portion of the fuel chamber main body with an outer portion thereof, a jet nozzle member having a front end portion inserted into the hole portion and injecting the return fuel into the chamber main body through the hole portion, a cover body covering at least an upper end periphery of the jet nozzle member and an upper end periphery of the hole portion, and a tubular circulating member having an upper end opening at a position lower than an upper edge of the chamber main body, having a lower end opening in such a manner as to communicate with an inner portion of the cover body and circulating the fuel within the chamber main body, are provided. Here, a gap is formed between an outer peripheral surface of the front end portion of the jet nozzle member and an inner peripheral surface of the hole portion and a pressure reduction chamber is formed so as to be decompressed in response to that the jet nozzle member injects the return fuel to the chamber main body through the hole portion substantially by the cover body. In this structure, the fuel stored within the fuel tank is introduced into the chamber main body through the gap portion in response to that the jet nozzle member injects the return fuel into the chamber main body through the hole portion, and the fuel within the chamber main body is circulated through the hole portion by a pressure reduction of the pressure reduction chamber in response to that the jet nozzle member injects the return fuel into the chamber main body through the hole portion.

The fuel chamber in accordance with the present invention is structured such as to introduce the fuel (the gasoline) within the fuel tank to the fuel chamber main body from the gap formed between the inner peripheral surface of the hole portion corresponding to the fuel introduction port and the outer peripheral surface of the front end of the jet nozzle member, to supply the gasoline within the fuel chamber main body to the fuel injection apparatus by the fuel pump (generally an electric pump), and to return the excessive fuel (the return gasoline) returned without being supplied to the engine within the fuel chamber main body from the jet nozzle member through the hole portion corresponding to the fuel introduction port.

In this case, in the fuel chamber in accordance with the present invention, the return gasoline is injected into the fuel chamber main body from the jet nozzle member through the hole portion corresponding to the fuel introduction port at a high speed, however, at this time, as mentioned above, since the gap is formed between the outer peripheral surface of the front end of the jet nozzle member and the inner peripheral surface of the hole portion corresponding to the fuel introduction port, a negative pressure is generated near the gap in accordance with Bernoulli's theorem, the gasoline within the fuel tank (the fresh gasoline) is forcibly sucked and introduced into the fuel chamber main body from the hole portion corresponding to the fuel introduction port together with the return gasoline, and the gasoline liquid surface within the fuel chamber main body is ascended. When the gasoline liquid surface reaches the upper end of the circulating passage of the circulating member, the pressure within the cover body covering the periphery of the jet nozzle and the hole portion corresponding to the fuel introduction port is reduced, so that the gasoline within the fuel chamber main body is forcibly sucked into the cover body through the circulating passage communicating the inner portion of the cover body with the middle portion to the upper portion in a vertical direction within the fuel chamber main body, and the gasoline (the circulating gasoline) is further sucked and returned to the lower portion within the fuel chamber main body from the hole portion corresponding to the fuel introduction port.

Then, the return gasoline introduced within the fuel chamber main body from the hole portion corresponding to the fuel introduction port, the fresh gasoline and the circulating gasoline are mixed by the liquid flow, a necessary amount is fed to the fuel injection apparatus (not shown) by the fuel pump p, and the remainder thereof ascends within the fuel chamber main body so as to be sucked into the cover body from the upper end of the circulating passage, and is introduced to the lower portion of the fuel chamber main body from the hole portion corresponding to the fuel introduction port, thereby being repeatedly circulated.

That is, in the fuel chamber in accordance with the present invention, the negative pressure is generated by the liquid flow of the return gasoline injected from the jet nozzle member, the fresh gasoline is introduced into the fuel chamber main body by using the negative pressure and the gasoline within the fuel chamber main body is forcibly circulated, so that the return gasoline is always circulated with being mixed with relatively a small amount of fresh gasoline always supplied, and a part of the circulating flow is fed to the fuel injection apparatus by the fuel pump.

Accordingly, in accordance with the fuel chamber of the present invention, the fresh gasoline (having a low temperature) within the fuel tank can be stably introduced into the fuel chamber main body, and can be forcibly and efficiently circulated within the chamber with effectively mixing the fresh gasoline with the return gasoline, thereby effectively performing a thermal separation, so that the vaporization of the gasoline due to the heat of the return gasoline can be significantly efficiently prevented.

Further, another object of the present invention is to provide a fuel chamber for an automotive vehicle which can effectively reduce a fear of generating an entrainment of an air.

In order to achieve the object mentioned above, as the next aspect in accordance with the present invention, there is provided a fuel chamber for an automotive vehicle, in which the circulating member has a lower end extending downward from an upper end of the cover body.

In accordance with the fuel chamber structured in the above manner, when the hole portion corresponding to the introduction port introduces the fuel (the gasoline) circulated into the fuel tank, the fuel entering into the pressure reduction chamber from the inner portion of the fuel tank through the fuel tank end communication hole is entrained by the negative pressure generated by the injection pressure of the return fuel (the return gasoline) so as to be fed out into the fuel chamber main body.

On the contrary, in the circulating member standing upward from the pressure reduction chamber, since the upper end is disposed in the lower position than the upper end edge of the fuel chamber main body, the fuel which is going to overflow toward the fuel tank due to the ascent of the liquid surface within the fuel chamber main body is dropped within the pressure reduction chamber so as to be circulated.

The lower end of the circulating member is extended downward to the position of being immersed into the fuel within the pressure reduction chamber from the upper wall portion of the pressure reduction chamber in such a manner as not to suck an air from the lower end thereof at a time of entraining the fuel entering into the pressure reduction chamber by generating the negative pressure due to the injection pressure of the circulated fuel.

Accordingly, since the lower end thereof is immersed within the fuel even when the height of the fuel liquid surface within the pressure reduction chamber is descended, the air is not sucked from the circulating member.

In this case, the circulating member may be extended downward from the upper end of the cover body in such a manner that the lower end thereof is disposed at a position lower than the position of the hole portion, so that even when the liquid surface of the fuel descends from the position of the hole portion, the lower end of the circulating member is securely positioned within the fuel and the air is not sucked from the circulating member.

Further, the pressure reduction chamber may be formed in such a manner as to cover the periphery of the jet nozzle member, and have a communicating hole communicating with the fuel tank and disposed at a position lower than the hole portion, the fuel introduced into the chamber main body may be introduced into the chamber main body through the gap portion after passing through the communicating hole in the pressure reduction chamber, and the circulating member may be extended downward from the upper end of the cover body in such a manner that the lower end thereof is disposed at a position upper than the position of the communicating hole and lower than the position of the hole portion, so that the fuel is circulated and supplied into the pressure reduction chamber without entrainment of the air. In this structure, in the case of positioning the communicating hole of the pressure reduction chamber in such a manner as to face the suction port of the fuel pump, since the fuel having relatively high temperature is going to be sucked by the fuel pump, the temperature within the fuel tank main body is prevented from increasing and the vapor generation is restricted.

Of course, when occasion demands, the circulating member may be extended downward from the upper end of the cover member in such a manner that the lower end thereof is disposed at a position lower than the position of the communicating hole, so that even when the liquid surface of the fuel descends from the position of the communicating hole, the lower end of the circulating member is securely positioned within the fuel and the air is not sucked from the circulating member.

Further, a cross sectional area of a flow passage in the circulating member may be larger than a cross sectional area of a flow passage in the communicating hole. Since the circulated fuel is dominantly supplied into the pressure reduction chamber and the fuel having relatively high temperature is going to be sucked by the fuel pump, the temperature increase of the fuel within the fuel tank is prevented and the vapor generation is restricted.

Still further, the circulating member may be structured such that the lower end thereof is bent in such a manner as to upward direct, so that since the fuel stays within the circulating member so as to close the lower end, the air suction is prevented.

Furthermore, the pressure reduction chamber may be formed in such a manner as to cover the periphery of the jet nozzle member and the circulating member may be extended downward from the upper end of the cover body in such a manner that the lower end thereof is immersed into the fuel within the pressure reduction chamber, so that the lower end of the circulating member is closed by the fuel and the air suction is prevented. In this case, the fuel storage layer may be provided within the pressure reduction chamber and the lower end of the circulating member is immersed into the fuel therewithin.

Moreover, a filter mesh member may be provided in the lower end of the circulating member, so that the filter mesh member impregnates the fuel and the lower end of the circulating member is closed by the fuel, thereby preventing the air suction.

Further, in the structure mentioned above, a wall portion independently provided from the circulating member may be connected to the lower end of the circulating member so that the circulating passage of the circulating member may be substantially extended within the pressure reduction chamber, whereby a forming characteristic of the fuel chamber main body becomes good.

Still further, in the structure mentioned above, the wall portion may be integrally formed with the jet nozzle member, or the wall portion may be integrally formed with the cover body. In each of the cases, there is an advantage of making the manufacture simple.

Furthermore, as the next aspect of the present invention, there is provided a fuel chamber for an automotive vehicle which is provided within a fuel tank of an automotive vehicle, introduces a fuel stored within the fuel tank to an inner portion thereof, and receives a fuel returned to the fuel tank through a fuel pump. In this aspect, a chamber main body, a recess portion formed in such a manner as to be recessed with respect to an inner portion of the fuel chamber main body in a corner portion of a lower end of the fuel chamber main body and provided with a hole portion communicating an inner portion of the fuel chamber main body with an outer portion, a tubular circulating member that has an upper end opening at a position lower than an upper end of the chamber main body, has a lower end opening in such a manner as to communicate with the recess portion and circulates the fuel within the chamber main body, a jet nozzle member that faces to the hole portion and injects the fuel returned to the fuel tank through the fuel pump into the fuel chamber main body through the hole portion, and a cover body that covers a periphery of the recess portion together with the jet nozzle and has a communicating hole communicating with the fuel tank formed. Here, a pressure reduction chamber is formed by the cover body and the recess portion, the fuel stored within the fuel tank is introduced into the chamber main body in response to that the jet nozzle member injects the return fuel into the chamber main body through the hole portion, and the fuel within the chamber main body is circulated through the hole portion by a pressure reduction of the pressure reduction chamber in response to that the jet nozzle member injects the return fuel into the chamber main body through the hole portion.

In accordance with the structure mentioned above, a module body in which a bottom surface of the pressure reduction chamber, an outer peripheral surface, a communicating hole and a wall portion are integrally formed with each other is provided in the recess portion of the fuel chamber, so that the structure can be made such that a number of the parts can e totally reduced and an assembly thereof can be easily performed.

Of course, the structure mentioned above further comprising a pipe member connected to the jet nozzle member in such a manner as to supply the fuel returned to the fuel tank through the fuel pump to the jet nozzle member, in which the cover body may be formed in such a manner as to unite the jet nozzle member to which the bottom surface of the pressure reduction chamber, the outer peripheral surface and the pipe member are connected, and further, the cover body may be connected to the lower end of the circulating member and the wall portion may be integrally formed in such a manner as to substantially extend the circulating passage of the circulating member within the pressure reduction chamber.

Further, the other object of the present invention is to provide a fuel chamber for an automotive vehicle which can introduce a fuel within a fuel tank into a fuel chamber main body and effectively prevents a backward flow of the fuel to the fuel tank, in which the fuel can be efficiently used to a level of a terminal end of the fuel within the fuel tank.

In order to achieve the object mentioned above, as the next step of the present invention, there is provided a fuel chamber for an automotive vehicle. In this aspect, a fuel chamber main body mounted on a bottom portion of the fuel tank, a communicating hole formed on a peripheral wall portion of the fuel chamber main body so as to communicate the fuel within the fuel tank, a backward flow prevention portion that has an upper end edge at a position higher than the bottom surface portion of the fuel chamber main body in an inner portion of the fuel chamber main body and preventing the fuel in the bottom surface portion of the fuel chambers main body in the case that the fuel stayed in the inner portion of the fuel chamber main body is in a low level and in the state that the fuel surface is inclined from flowing backward from the communicating hole, and a fuel storage recess portion provided between the upper end edge of the backward flow prevention portion and the communicating hole in a predetermined direction by setting a position of the communicating hole higher than the bottom surface portion of the fuel chamber main body.

In the fuel chamber structured in the above manner, since the communicating hole formed on the peripheral wall portion of the fuel chamber main body mounted on the bottom portion of the fuel tank of the vehicle is formed in such a manner as to be higher than the bottom surface portion of the chamber main body, the fuel within the tank is introduced into the fuel chamber main body through the communicating hole. At this time, since the fuel is introduced toward the bottom surface portion disposed at the lower position from the communicating hole formed at the higher position, it is easy to get over the backward flow prevention portion.

Further, the fuel storage recess portion disposed between the upper end edge of the backward flow prevention portion and the position forming the communicating hole stores the fuel. The fuel stored in the fuel storage recess portion gets over the upper end edge of the backward flow prevention portion by the vibration or the inclination of the chamber main body or the like, and is flown out on the bottom surface portion of the fuel chamber main body at a low position.

Then, the fuel once introduced on the bottom surface portion of the fuel chamber main body at a low position is prevented from being flown backward from the communicating hole by the backward flow prevention portion.

Accordingly, the fuel can be efficiently sucked to the extent near the terminal end.

Further, the backward flow prevention portion may be constituted by a backward flow prevention wall which is formed along the peripheral wall portion of the fuel chamber main body from the position at which the communicating hole is formed to the substantially opposite position within the fuel chamber main body and separates the inner portion of the chamber main body, a groove-like passage disposed along the inner surface of the peripheral wall portion of the fuel chamber main body, and a high position feeding portion having a front end portion disposed at a position higher than the bottom surface portion of the fuel chamber main body at a substantially opposite position within the fuel chamber main body from the position of the communicating hole in the groove-like passage, and the fuel storage recess portion may be formed by recessing at least a part of the groove-like passage between the communicating hole and the high position feeding portion. In accordance with the recess portion mentioned above, it is possible to drop the dust in the fuel.

Still further, it is preferable that the groove-like passage is formed in an inclined manner such as to be lower than the position of the communicating hole near the communicating hole and gradually increase a height toward the high position feeding portion from the communicating hole in view that the backward flow prevention can be obtained by a simple structure.

DETAILED DESCRIPTION OF THE PREFERRED EMBODIMENTS

A fuel chamber for an automotive vehicle in accordance with the present invention will be described in detail below with reference to the attached drawings.

Figure 1:
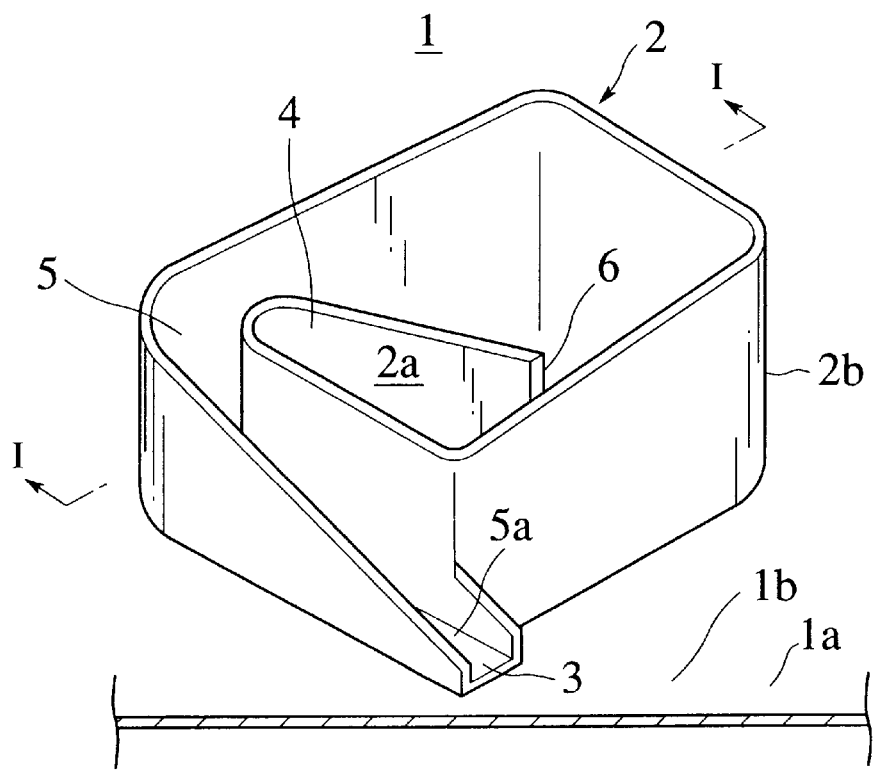
FIG. 1 is a perspective view which shows a structure of a conventional fuel chamber.
Figure 2:
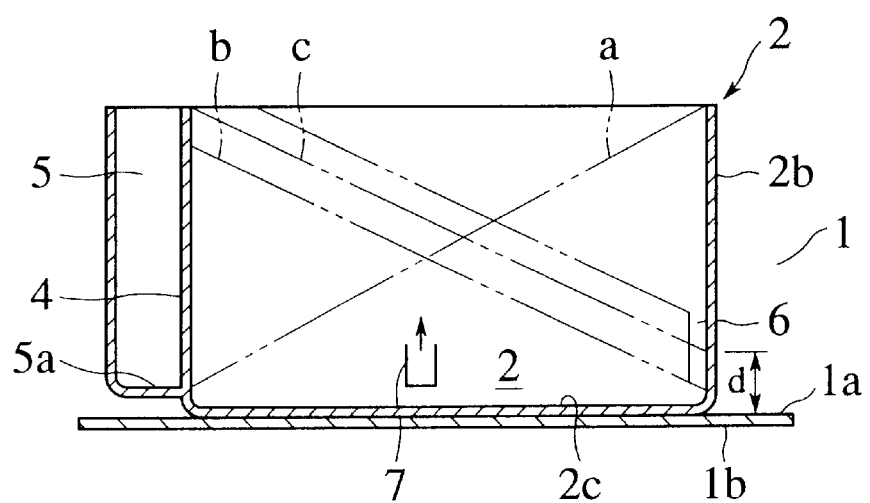
FIG. 2 is a cross sectional view along a line I—I in FIG. 1.
Figure 3:
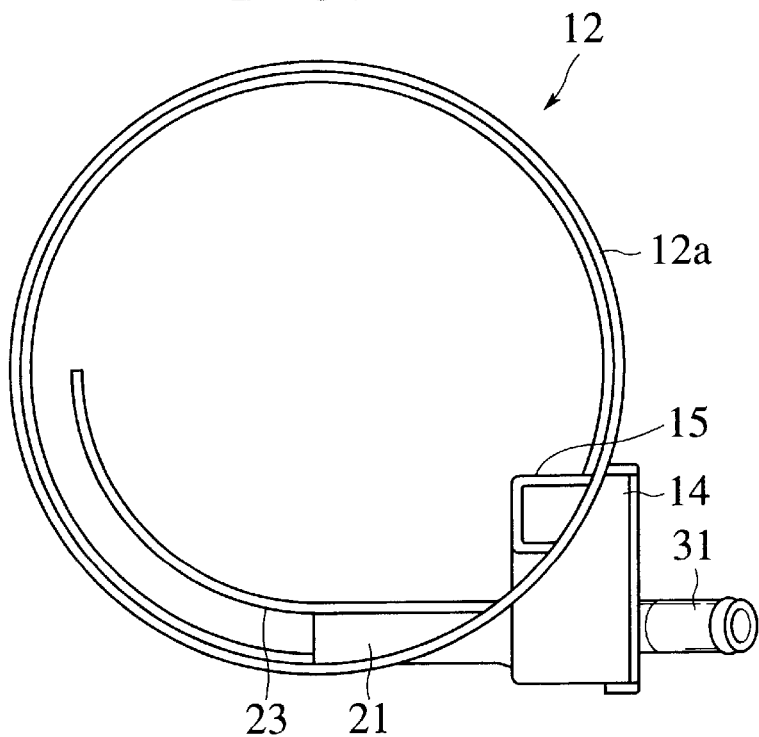
FIG. 3 is a plan view which shows a fuel chamber in accordance with a first embodiment of the present invention.
Figure 4:
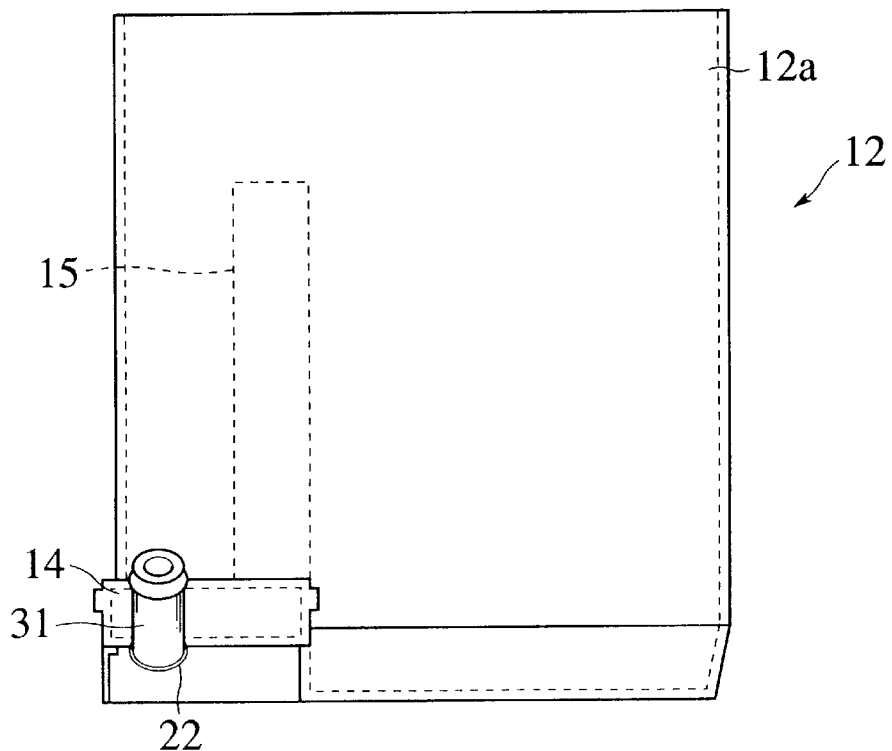
FIG. 4 is a side elevational view of the fuel chamber in accordance with the same.
Figure 5:
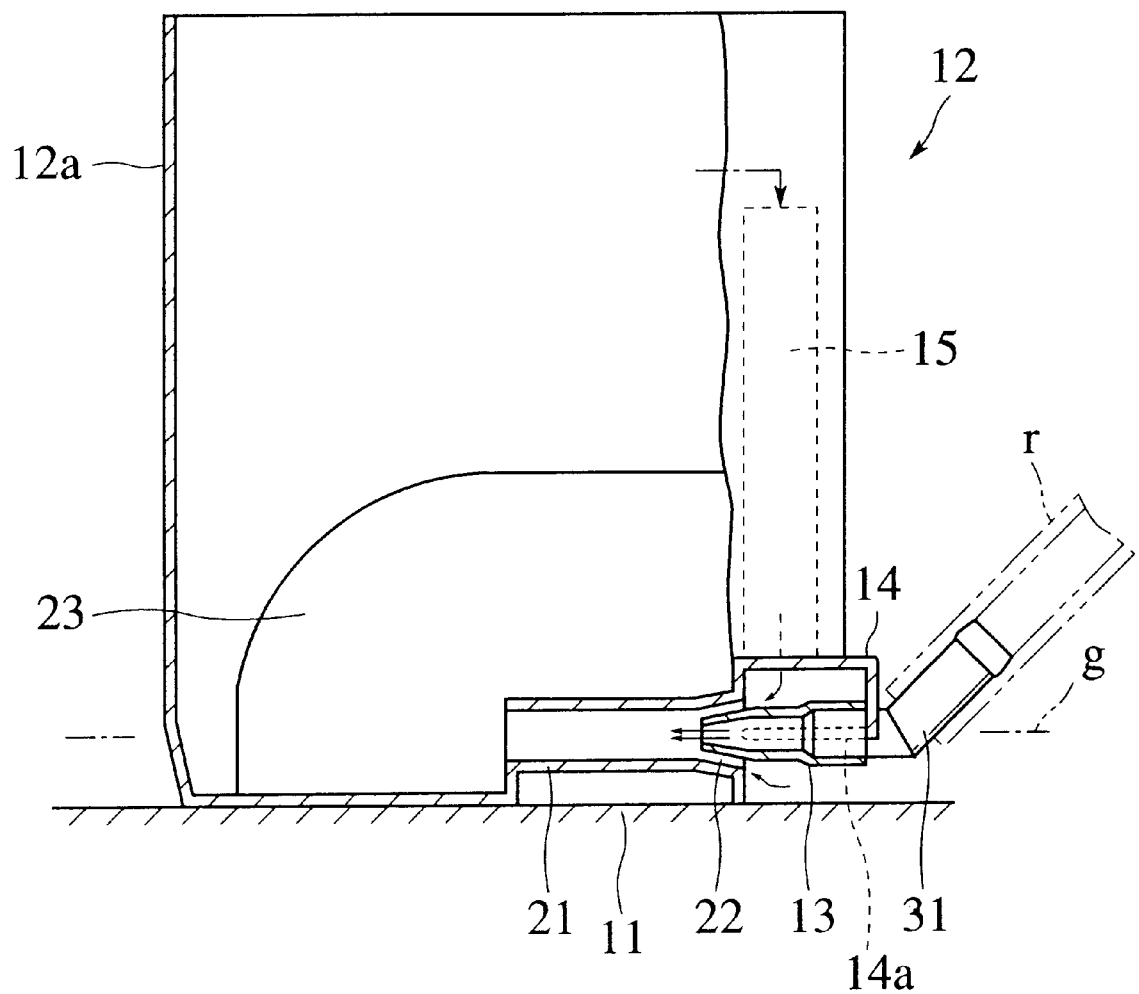
FIG. 5 is a front elevational view which shows a part of the fuel chamber as across section in accordance with the same.
Figure 7:
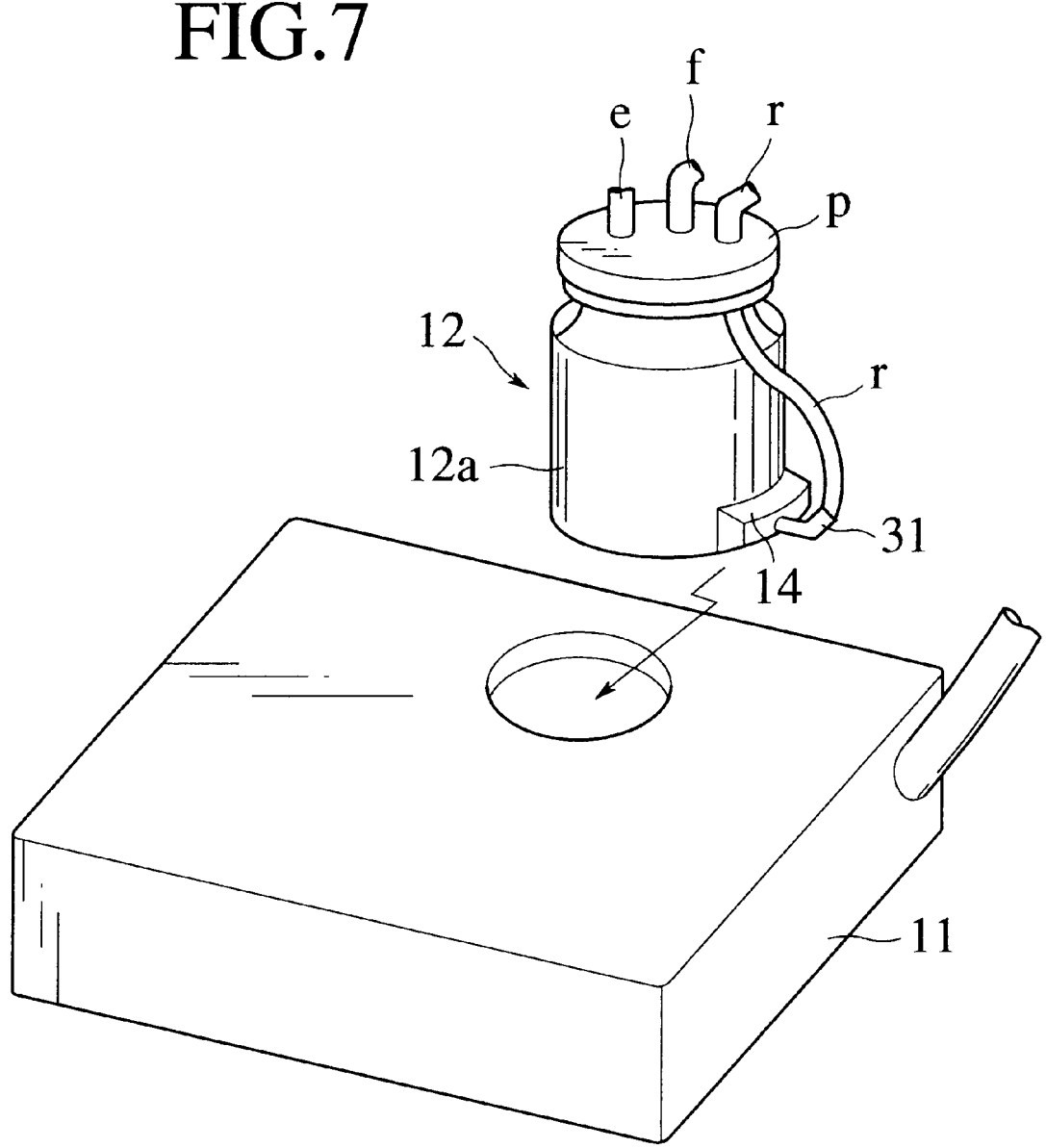
FIG. 7 is a schematic view which shows a use aspect of the fuel chamber in accordance with the same.

FIGS. 3 to 5 show a fuel chamber 12 in accordance with a first embodiment of the present invention. The fuel chamber 12 has a circular and box-like fuel chamber main body 12a having an upper end surface open, and is disposed within a fuel tank 11 for an automotive vehicle with mounting an electric fuel pump p within the fuel chamber main body 12a, as shown in FIG. 7.

In this case, as shown in FIG. 5, a bottom wall of the fuel chamber main body 12a is in contact with an inner surface of a bottom wall in the fuel tank 11. In this case, in FIG. 7, reference symbol f denotes a fuel pipe pressing a fuel within the fuel tank 11 to a fuel injection apparatus (not shown), reference symbol r denotes a return pipe returning an excessive fuel returned without being supplied to a combustion chamber of an engine (the return gasoline) to the fuel chamber 12, and reference symbol e denotes a cable for supplying a current to the pump p.

The fuel chamber main body 12a is provided with a suction pipe 21 extending through the chamber main body 12a along a tangential direction in a peripheral wall of a lower end portion thereof, and an outer front end portion of the suction pipe 21 corresponds to a fuel introduction port 22 for a hole portion gradually expanding (refer to FIG. 5). Further, within the fuel chamber main body 12a, a partition wall 23 curved along an inner surface of the peripheral wall substantially in a circular arc manner is stood around, for example, half periphery from a portion through which the suction pipe 21 of the peripheral wall extends, and the partition wall 23 has a height substantially half the fuel chamber main body 12a, and a gap having the same width as an outer diameter of the suction pipe 21 is formed between the partition wall 23 and the inner surface of the peripheral wall in the fuel chamber main body 12a.

Further, within the fuel chamber main body 12a, a circulating passage 15, for example, corresponding to a rectangle tubular circulating member is disposed along a vertical direction near the arranging portion of the suction pipe 21. An upper end of the circular passage 15 is open in an upper portion within the fuel chamber main body 12a, and a lower end thereof is open within a cover body 14 mentioned below.

Next, a jet nozzle 13 corresponding to a blowing member and having a front end being gradually made a small diameter is disposed and fixed to an outer portion of the fuel chamber main body 12a in a state of inserting the front end into the fuel induction port 22 of the suction pipe 21, and a little gap is formed between the outer peripheral surface of the front end of the jet nozzle 13 and the inner peripheral surface of the fuel introduction port 22.

In this case, a width of the gap formed between the outer peripheral surface of the front end of the jet nozzle 13 and the inner peripheral surface of the fuel introduction port 22 is suitably set in correspondence to a flow amount of the fuel, a flow speed, a diameter of the suction pipe 21, a diameter of the jet nozzle 13 and the like, and is not particularly limited, however, it is generally preferable to set it to be about 0.5 to 2 mm, particularly 0.8 to 1.7 mm, and further 0.9 to 1.1 mm. When the width of the gap is less than 0.5 mm, there is a case that an introduction amount of the fuel to the fuel chamber main body 12a is insufficient, and on the contrary, when it is more than 2 mm, a negative pressure is insufficiently generated due to Bernoulli's theorem, so that there is a case that the fuel can not be well sucked into the fuel chamber main body 12a.

Further, a rectangle box-like cover body 14 covering the periphery of the upper portion of the jet nozzle 13 and the upper portion of the fuel introduction port 22 and having a lower end surface closed by the lower end wall except the portion near the front end portion of the jet nozzle 13 and the fuel introduction port 22 is disposed at a portion in which the jet nozzle 13 outside the fuel chamber main body 12a is arranged, as shown in FIG. 3, a part of the cover body 14 projects into the fuel chamber main body 12a, the lower end of the circulating passage 15 is connected to the inner projecting portion, and the lower end of the circulating passage 15 is open within the cover body 14.

Figure 6A:
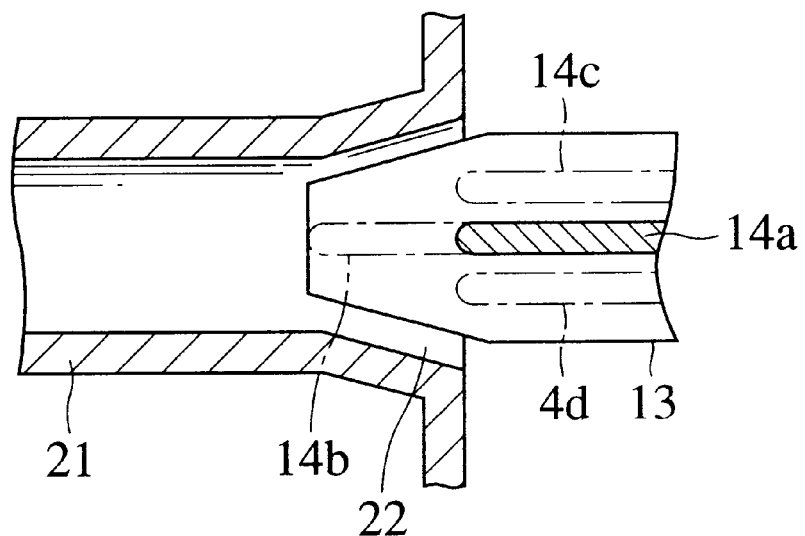
FIG. 6A is a partly enlarged cross sectional view which shows a lower end wall of a cover body in the fuel chamber in accordance with the same.
Figure 6B:
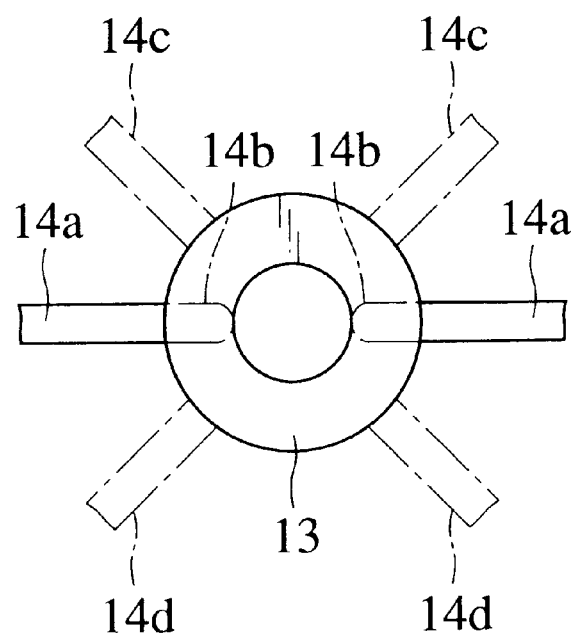
FIG. 6B is a schematic view which shows a lower end wall of the cover body in the fuel chamber in accordance with the same.

In this case, the lower end wall 14a of the cover body 14 is closely attached to the outer peripheral surface of the jet nozzle 13, and is formed along an axial direction in such a manner as to separate the outer periphery of the jet nozzle 13 just into upper and lower half peripheries as shown in FIG. 6, and a front end thereof is in a state of being in a close contact or in contact with an edge portion of the fuel introduction port 22. In this case, the lower end wall of the cover body 14 is not limited to this aspect, for example, as shown in FIG. 6 by a single-dot chain line 14b, the front end may be extended to the front end of the jet nozzle 13, or as shown by a single-dot chain line 14c in the same drawing, an aspect of separating the outer periphery of the jet nozzle 13 into an upper end constituted by a quarter periphery and a lower end constituted by three quarters periphery may be employed, or as shown by a single-dot chain line 14d in the same drawing, an aspect of separating the outer periphery of the jet nozzle 13 into an upper end constituted by three quarters periphery and a lower end constituted by a quarter periphery may be employed. Further, when the whole of the cover body 14 is structured in such a manner as to substantially cover the periphery of the upper portion of the jet nozzle 13 and the periphery of the upper portion of the fuel introduction port 22, the other aspect can be employed.

Further, a connecting tube 31 bent in an L shape is mounted to the jet nozzle 13 in such a manner as to extend through the cover body 14, and as shown in FIGS. 5 and 7, it is structured such that the return pipe r is connected to the connecting tube 31.

Next, an operation of the fuel chamber 12 in accordance with this embodiment will be described below.

The fuel chamber 12 in accordance with this embodiment is, as shown in FIG. 7, structured such as to mount the electric fuel pump p within the fuel chamber main body 12a, to connect the return pipe r to the connecting tube 31 so as to dispose within the fuel tank 11 of the automotive vehicle, and in this case as shown in FIG. 5, to bring the bottom wall of the fuel chamber main body 12a into contact with the inner surface of the bottom wall of the fuel tank 11. In this state, the fuel (the gasoline) within the fuel tank 11 is introduced into the fuel chamber main body 12a from a gap formed between the inner peripheral surface of the fuel introduction port 22 and the outer peripheral surface of the front end of the jet nozzle 13, the gasoline within the fuel chamber main body 12a is supplied to the fuel injection apparatus (not shown) through the fuel pipe f by the fuel pump p, and the excessive fuel (the return gasoline) returned through the return pipe r without being supplied to the combustion chamber in the engine is introduced into the fuel chamber main body 12a through the fuel introduction port 22 from the jet nozzle 13.

In this case, in the fuel chamber 12 in accordance with this embodiment, since the return gasoline is injected into the fuel chamber main body 12a through the fuel introduction port 22 from the jet nozzle 13 at a high speed, and at this time, the gap is formed between the outer peripheral surface of the front end of the jet nozzle 13 and the inner peripheral surface of the fuel introduction port 22, the negative pressure is generated near the gap in accordance with Bernoulli's theorem, and the gasoline within the fuel tank 11 (the fresh gasoline) is forcibly sucked and introduced into the fuel chamber main body 12a from the fuel introduction port 22 together with the return gasoline, so that the liquid surface of the gasoline within the fuel chamber main body 12a is ascended. When the liquid surface of the gasoline reaches the upper end of the circulating passage 5, the gasoline within the fuel chamber main body 12a is forcibly sucked into the cover body 14 through the circulating passage 15 communicating the inner portion of the cover body 14 with the upper portion within the fuel chamber main body 12a since the pressure of the inner portion of the cover body 14 which covers the periphery of the front end portion of the jet nozzle 13 and the fuel introduction port 22 is reduced due to the negative pressure. Further, the gasoline (the circulating gasoline) is forcibly returned to the lower portion within the fuel chamber main body 12a from the fuel introduction port 22.

Then, the return gasoline introduced into the fuel chamber main body 12a from the fuel introduction port 22, the fresh gasoline and the circulating gasoline are guided by the inner surface of the peripheral wall of the fuel chamber main body 12a and the partition wall 23 so as to form a vortex flow with swirling, a necessary amount is fed to the fuel injection apparatus (not shown) by the pump p, and the remainder is ascended within the fuel chamber main body 12a as the vortex flow, sucked into the cover body 14 from the upper end of the circulating passage 15, again introduced into the lower portion of the fuel chamber main body 12a from the fuel introduction port 22, and repeatedly circulated.

Accordingly, in accordance with the fuel chamber 12 of this embodiment, the negative pressure is generated by the liquid flow of the return gasoline injected from the jet nozzle 13, the fresh gasoline is introduced into the fuel chamber main body 12a by utilizing the negative pressure, and the gasoline within the fuel chamber main body 12a is forcibly circulated, so that the return gasoline forms the vortex flow while being mixed with a relatively little amount of always supplied fresh gasoline so as to be always circulated and a part of the circulated flow is fed to the fuel injection apparatus by the pump p.

In this case, since the cover body 14 completely covers the upper end of the jet nozzle 13 and the inner portion thereof is only communicated with the inner portion of the fuel chamber main body 12a by the fuel introduction port 22 and the circulating passage 15, so as to form a closed area which is completely shut from the outer portion of the fuel chamber 12 of this embodiment, the pressure of the inner portion of the cover body 14 is securely reduced and a good circulating state can be securely maintained even when the gasoline within the fuel tank 11 is reduced as shown in a single-dot chain line in FIG. 5 and the liquid surface g becomes very low.

As mentioned above, in accordance with the fuel chamber 12 of this embodiment, since the return gasoline having a high temperature and having a little amount of vapor generating component is circulated by the negative pressure generated by the liquid flow of the return gasoline with using the jet nozzle 13 so as to restrain the fresh gasoline (having a low temperature) within the fuel tank 11 from being introduced into the fuel chamber main body 12a, it can be prevented that a lot of fresh gasoline having a lot of vapor generating component is mixed with the high temperature return gasoline and the vapor generating component contained in the fresh gasoline is vaporized, so that the thermal separation can be effectively performed and the vaporization of the gasoline due to the heat of the return gasoline can be significantly efficiently prevented.

Figure 8:
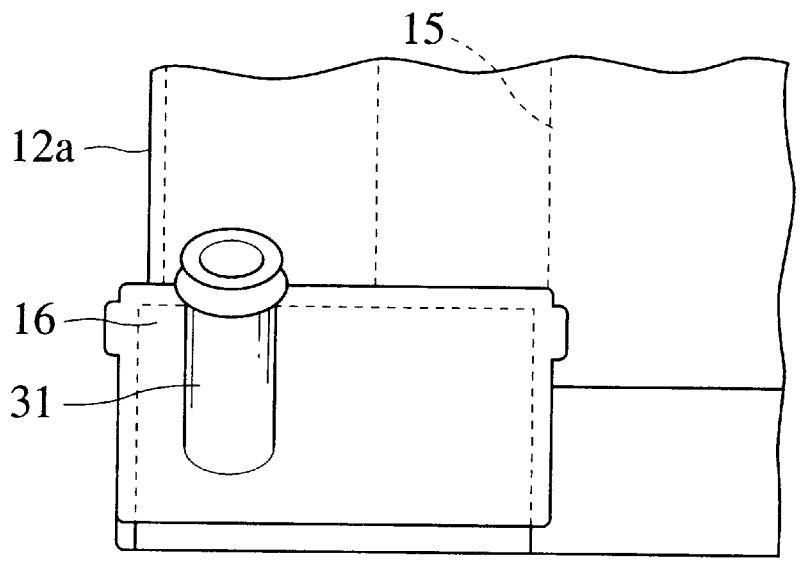
FIG. 8 is a partly enlarged view which shows a fuel chamber in accordance with a modified embodiment of the first embodiment in accordance with the present invention.
Figure 9:
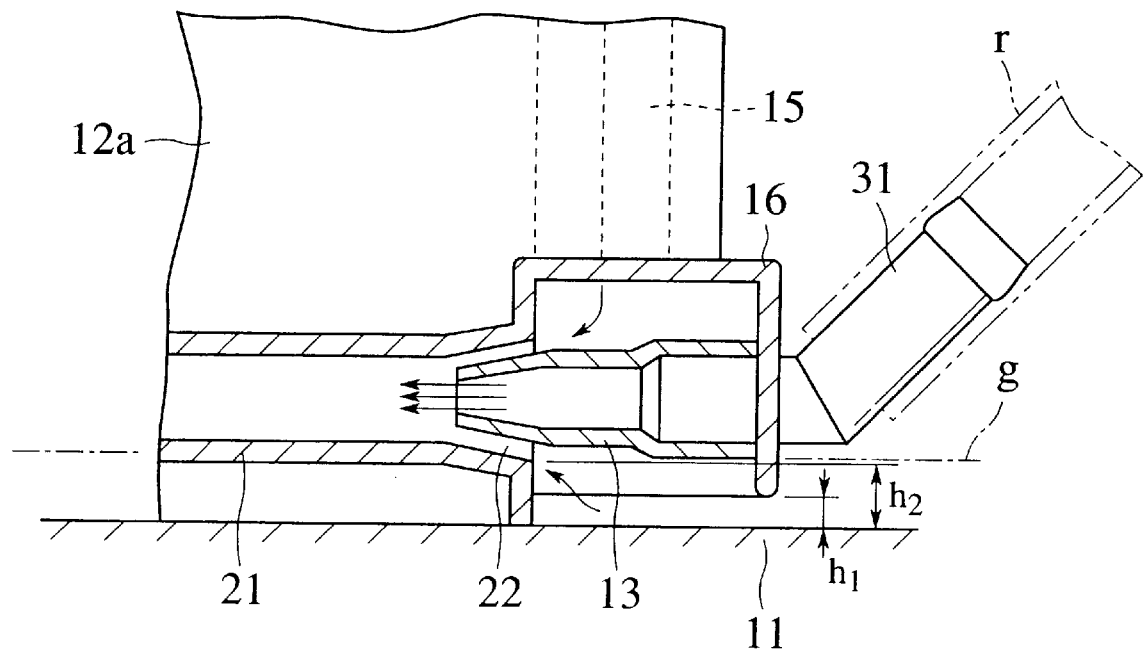
FIG. 9 is a partly enlarged cross sectional view which shows the fuel chamber in accordance with the same.

Next, FIGS. 8 and 9 show a fuel chamber in accordance with a modified embodiment of the present embodiment, and the fuel chamber is provided with a rectangle box-like cover body 16 having a lower end surface open and covering from the upper portion of the jet nozzle 13 to the lower portion in the side end of the fuel introduction port 22 in place of the cover body 14 in the fuel chamber 12 in FIGS. 3 to 5, and the other structure is substantially the same as that of the fuel chamber 12 in FIGS. 3 to 5.

In this case, in the fuel chamber, a height h1 (refer to FIG. 9) of the lower end surface in which the cover body 16 is open is set to be lower than a height h2 (refer to FIG. 9) of the fuel introduction port 22. Accordingly, as shown in a single-dot chain line in FIG. 9, even when the gasoline within the fuel tank 11 is reduced so that the liquid surface g becomes very low, the open lower end surface of the cover body 16 is securely closed by the gasoline within the fuel tank 11 and the air within the fuel tank does not enter into the cover body 16, thereby securely and effectively reduce the pressure within the cover body 16 due to the negative pressure generated by the liquid flow of the return gasoline by using the jet nozzle 13 and securely performing the suction of the fresh gasoline and the circulation of the circulating gasoline.

In this case, since the fuel chamber shown in FIGS. 8 and 9 has the same structure as the fuel chamber 12 shown in FIGS. 3 to 5 in view of the structure other than the cover body 16 and the operation and effect other than the matter mentioned above, the description of the other structure and the operation and effect will be omitted.

As mentioned above, the first embodiment in accordance with the present invention and the modified embodiment are described, however, the fuel chamber in accordance with the present invention is not limited to this, and can be modified in various manner. For example, in the embodiment mentioned above, the structure is made such that the pump p is mounted within the fuel chamber main body 12*a*, the pump p may be provided outside the fuel chamber main body 12*a*, or may be provided outside the fuel tank 11, and only the suction pipe connected to the pump p may be disposed within the fuel chamber main body 12*a*. Further, in the embodiment mentioned above, the suction pipe 21 is mounted to the fuel chamber main body 12*a* and the opening portion of one end in the suction pipe 21 forms the fuel introduction port 22, however, the suction pipe 21 may be omitted, and the fuel introduction port 22 may be directly formed on the peripheral wall of the fuel chamber main body 12*a*. Further, in the embodiment mentioned above, the fuel chamber main body 12*a* is formed in a circular shape and the partition wall 23 is provided so as to make the circulating fuel the vortex flow, however, the partition wall 23 may be omitted, the shape of the fuel chamber main body 12*a* may be formed in a shape such as a rectangular shape other than a circular shape in accordance with the shape of the fuel tank, and the other structure may be suitably modified within the scope of the present invention.

A second embodiment in accordance with the present invention will be described below with reference to the drawings.

Figure 10:
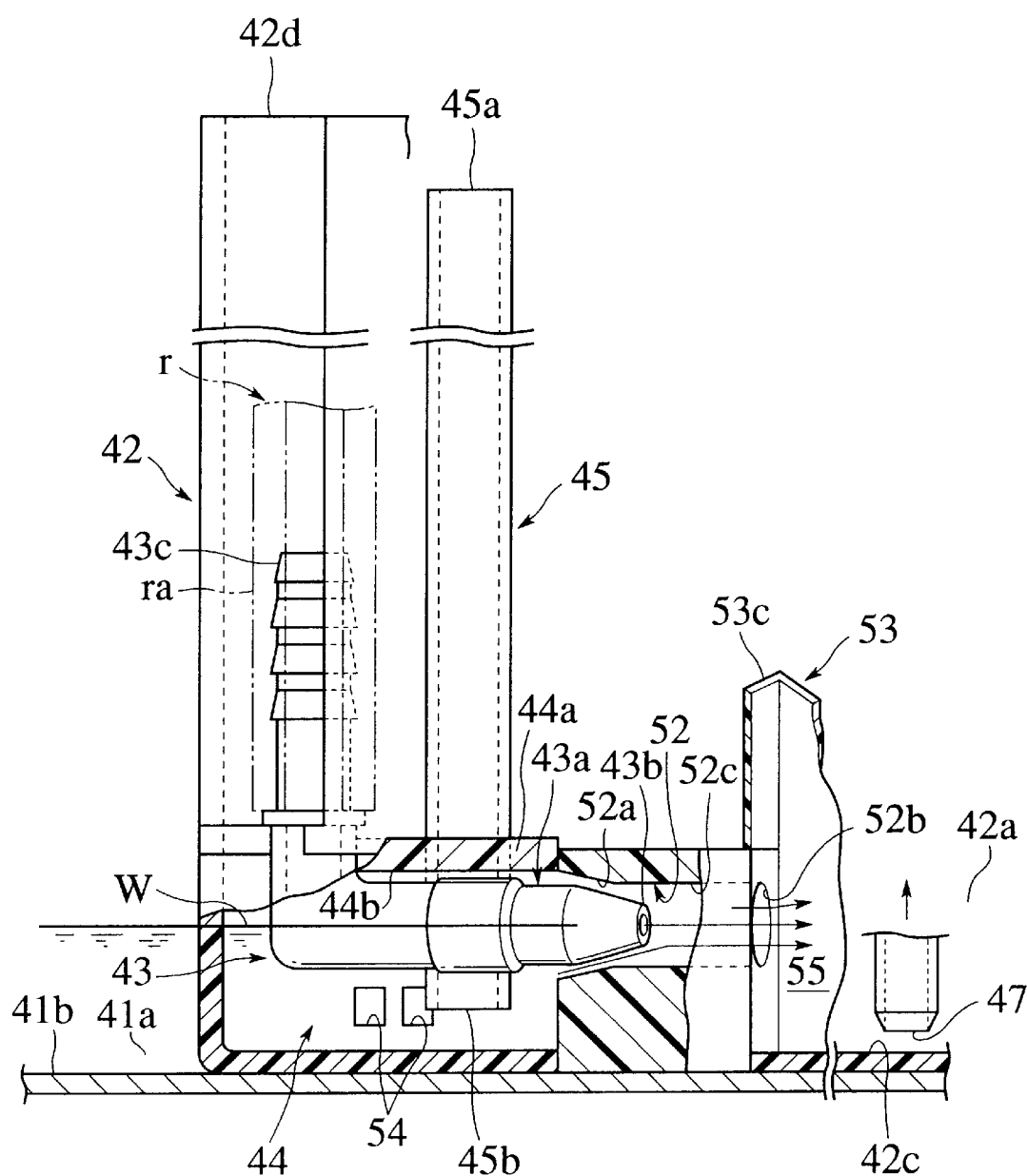
FIG. 10 is a partly cross sectional view which shows a fuel chamber along a line II—II in FIG. 11 in accordance with a second embodiment of the present invention.
Figure 11:
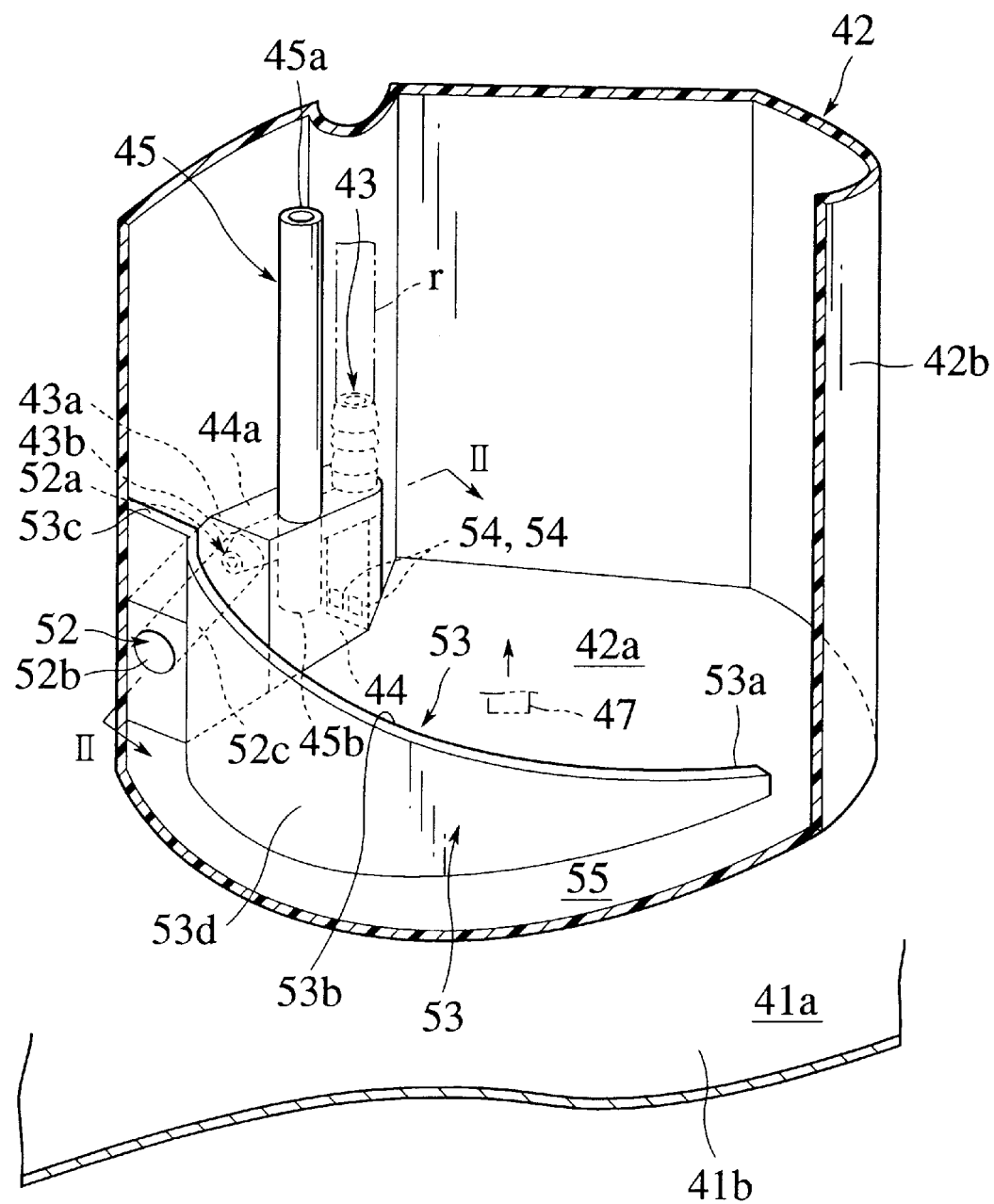
FIG. 11 is a partly cross sectional perspective view which shows the fuel chamber in accordance with the same.

FIGS. 10 and 11 show a structure of a fuel chamber in accordance with the second embodiment of the present invention.

At first, the structure will be described. In the structure of the fuel chamber in accordance with the second embodiment, a fuel chamber 42 corresponding to a swirling tank is fixed to a bottom surface portion 41*b* of a fuel tank main body 41*a* storing the fuel for the vehicle. Further, a fuel pump suction port 47 is disposed in such a manner as to face within the fuel chamber main body 42*a* substantially formed in a cylindrical shape with a bottom and no top of the fuel chamber 42, and it is structured such that the fuel within the fuel chamber main body 42*a* is sucked out by the fuel pump.

A hole portion 52 corresponding to a fuel introduction port which feeds out the fuel into the fuel chamber main body 42*a* is formed in the peripheral wall portion 42*b* of the fuel chamber main body 42*a*.

The hole portion 52 is mainly structured such as to be provided with a pressure reduction chamber 44, a taper opening portion 52*a* communicating with the pressure reduction chamber 44, a cylindrical portion 52*c* extending from the taper opening portion 52*a* and a chamber end opening 52*b*. A backward flow prevention wall portion 53 is formed within the fuel chamber 42*a* close to the chamber end opening 52*b*. The backward flow prevention wall portion 53 is mainly constituted by a standing portion 53*c* integrally extending upward from the upper wall portion 44*b* of the pressure reduction chamber disposed above the chamber end opening 52*b*, and an upper end portion 53*b* of a wall surface main body 53*d* descending toward a front end portion 53*a* from the standing portion 53*c* with a predetermined inclination.

The wall surface main body 53*d* is provided along the peripheral wall portion 42*b* from a position forming the chamber end opening 52*b* to a substantially opposite position of the fuel chamber main body 42*a* in such a manner as to substantially form, for example, a half circular arc shape, so that the a flow passage 55 separated from the fuel chamber main body 42*a* is formed.

Further, the pressure reduction chamber 44 is structured in such a manner as to substantially form a hollow portion having a box shape.

In this the pressure reduction chamber 44, fuel tank end communicating holes 54 and 54 communicating with the inner portion of the fuel tank main body 41*a* are formed at a low position adjacent to the bottom surface portion 41*b* of the fuel tank, and the fuel tank end communicating holes 54 and 54 are disposed at a position lower than the chamber end opening portion 52*b*.

Further, the jet nozzle 43 corresponding to a blowing member having a substantially L shape is attached to the outer wall of the pressure reduction chamber 44. It is structured such that the rear end portion 43*c* of the jet nozzle 43 is connected to a front end ra of a return pipe r in which a return fuel having a predetermined pressure flows and the return fuel returned toward the fuel tank main body 41*a* is directly introduced into the fuel chamber main body 42*a*.

Then, the introduction port portion 43*a* having a tapered front end portion 43*b* is provided in the jet nozzle 43, and the introduction port portion 43*a* is inserted and faced within the pressure reduction chamber 44 in such a manner that the front end portion 52*b* of the introduction port portion is positioned within the tapered opening portion 52*a* of the hole portion 52 with a predetermined clearance.

Further, a circulating pipe 45 corresponding to a hollow circulating member is stood upward from the pressure reduction chamber 44 in the upper wall portion 44*a* of the pressure reduction chamber 44.

An upper end opening 45*a* is disposed at a position lower than an upper end edge 42*d* of the fuel chamber main body, and the lower end opening 45*b* is extended downward from the lower surface end 44*b* of the upper wall portion 44*a*, so that the circulating pipe 45 is extended to a position immersed into the fuel within the pressure reduction chamber 44 even when a liquid surface w of the fuel within the pressure reduction chamber 44 is lowered in such a manner not to suck an air from the lower end opening 45b at a time of entraining the fuel entering into the pressure reduction chamber 44 from the fuel tank end communicating holes 54 and 54 by generating a negative pressure due to an injection pressure of the return fuel from the front end portion 43b of the introduction port portion.

Further, in accordance with the second embodiment, the lower end opening 45b of the circulating pipe is extended from a height disposed at a position lower than the chamber end opening portion 52b and substantially extended to the same height as the position of forming the fuel tank end communicating holes 54 and 54.

Accordingly, the position of the lower end opening 45b of the circulating pipe is set to be a height position in the middle of the forming position of the fuel tank end communicating holes 54 and 54 and the forming position of the chamber end opening portion 52b.

Still further, in accordance with the second embodiment, a cross sectional area of the flow passage of the circulating pipe 45 is set in such a manner as to be greater than a cross sectional area of a total flow passage of the fuel tank end communicating holes 54 and 54.

Next, an operation in accordance with the second embodiment will be described below.

In accordance with the structure of the fuel chamber of the second embodiment, since the lower end opening 45b of the circulating pipe 45 is immersed into the fuel even when the height of the liquid surface w of the fuel within the pressure reduction chamber 44 is lowered as shown in FIG. 10, the lower end opening 45b is in a state of being closed by the fuel, so that the risk that an air is sucked from the circulating pipe 45 is reduced.

Accordingly, the risk of generating an air suction sound is reduced, and further, the introduction port portion 43a directly introduce the fuel returned toward fuel tank main body 41a into the pressure reduction chamber 44 and feeds out at a predetermined pressure, so that the negative pressure generated due to a clearance formed between the front end portion 43b and the tapered opening 52a does not escape. Therefore, the fuel immersed within the pressure reduction chamber 44 through the fuel tank end communicating holes 54 and 54 from the inner portion of the fuel tank main body 41a is fed out within the fuel flow passage 55 through the cylindrical portion 52c and the chamber end opening 52b from the pressure reduction chamber 44 in such a manner as to be entrained by the fuel injected from the front end portion 43b.

The fed out fuel flows within the fuel passage 55 and is fed out within the fuel chamber main body 42a from the portion adjacent to the front end portion 53a of the backward flow prevention wall portion 53 formed substantially in the opposite end. The fuel fed out within the fuel chamber main body 42a stays on the upper surface of the chamber bottom surface portion 42c, and is not flown backward to the direction of the pressure reduction chamber 44 through the chamber end opening 52b due to the backward flow prevention wall portion 53 even when the liquid surface is inclined.

Accordingly, the remaining fuel within the fuel tank main body 41a is introduced into the fuel chamber main body 42a, and the fuel is sucked from the fuel pump suction port 47 facing within the fuel chamber main body 42a to an extend close to the terminal end of the fuel remained within the fuel tank main body 41a.

As mentioned above, when the introduction port portion 43a directly introduces the fuel returned toward the fuel tank into the fuel chamber main body 42a, the fuel entering into the pressure reduction chamber 44 from the inner portion of the fuel tank main body 41a through the fuel tank end communicating holes 54 and 54 is entrained due to the negative pressure generated by the injection pressure of the return fuel and is fed out within the fuel chamber main body 42a from the chamber end opening portion 52b of the hole portion 52.

On the contrary, the fuel which is going to overflow to the inner portion of the fuel tank main body 41a from the upper end edge 42d due to an ascent of the liquid surface within the fuel chamber main body 42a firstly flows down within the circulating pipe 45 from the upper end opening 45a and is flown down into the pressure reduction chamber 44 from the lower end opening 45b so as to be circulated.

Then, since the lower end opening 45b of the circulating pipe 45 is extended, for example, to the same height as the forming position of the fuel tank end communicating holes 54 and 54, the lower end opening 45b is immersed into the fuel so that the air is not sucked from the circulating pipe 45 even when the liquid surface w of the fuel is lowered to substantially the same height as the forming position of the fuel tank end communicating holes 54 and 54.

Accordingly, since the negative pressure generated by introducing the return fuel circulatedly returned toward the fuel tank end to the introduction port portion 43a does not escape from the pressure reduction chamber 44, the fuel within the fuel tank main body 41a is fed out within the fuel chamber main body 42a through the chamber end opening 52b from the pressure reduction chamber 44.

Therefore, the remaining fuel within the fuel tank main body 41a is introduced into the fuel chamber main body 42a and the fuel is sucked from the fuel pump suction port 47 facing within the fuel chamber main body 42a. The fuel is introduced into the fuel chamber main body 42a until an extent close to the terminal end in which the height of the liquid surface w within the pressure reduction chamber is lowered to substantially the same height as the forming position of the fuel tank end communicating holes 54 and 54.

Further, in the second embodiment, the lower end 45b of the circulation pipe 45 is extended to an extent lower than the chamber end opening portion 52b among the hole portion 52.

Accordingly, since the lower end 45b is immersed into the fuel until the liquid surface of the fuel is lowered to an extent lower than the chamber end opening portion 52b, the air is not sucked from the circulating pipe 45.

Therefore, the fuel within the fuel tank main body 41a is introduced into the pressure reduction chamber 44 until the air is introduced into the pressure reduction chamber 44 through the fuel tank end communicating holes 54 and 54 due to the inclination or the like, and the fuel filling the pressure reduction chamber 44 is fed out within the fuel chamber main body 42a through the tapered opening 52a of the hole portion 52, the cylindrical portion 52c and the chamber end opening 52b.

Accordingly, since the negative pressure sucking the fuel within the fuel tank main body 41a from the fuel tank end communicating holes 54 and 54 is generated, the remaining fuel within the fuel tank main body 41a is further introduced into the fuel chamber main body 42a. Therefore, the fuel is introduced into the fuel chamber main body 42a to an extent close to the terminal end in which the liquid surface of the fuel is lowered to substantially the same height as or lower than the forming position of the fuel tank end communicating holes 54 and 54.

Then, in the second embodiment, since the fuel tank end communicating hole 54 is disposed at a position lower than the chamber end opening portion 52b and the position of the circulating pipe lower end 45b is set to be a height position between the forming position of the fuel tank end communicating holes 54 and 54 and the forming position of the chamber end opening portion 52b, the circulated fuel within the fuel chamber main body 42a is at first flown into the pressure reduction chamber 44 by the circulating pipe 45 with priority, and is fed into the fuel chamber main body 42a together with the return fuel pressed from the front end portion 43b.

Accordingly, since the fuel having relatively a high temperature is sucked from the fuel pump suction port 47 so as to be fed to the engine direction, the fuel within the fuel tank main body 41a is prevented from becoming a high temperature and a vapor generation is restricted, and the temperature of the fuel sucked from the pump suction port 41 and fed can be made close to the temperature of the return fuel.

Further, in accordance with the second embodiment, since the cross sectional area of the flow passage of the circulating pipe 45 is set to be greater than the cross sectional area of the total flow passage of the fuel tank end communicating holes 54 and 54, the circulated fuel within the fuel chamber main body 42a is at first flown into the pressure reduction chamber 44 by the circulating pipe 45 with further priority, and is fed into the fuel chamber main body 42a.

In this view, since the fuel having relatively a high temperature is sucked from the fuel pump suction port 47 and is fed, the fuel within the fuel tank main body 41a is prevented from becoming a high temperature and a vapor generation is restricted, and further, the temperature of the fuel sucked form the pump suction port 47 and fed is made close to the temperature of the return fuel, so that the temperature of whole of the fuel tank unit end can be prevented from being increased.

Figure 12:
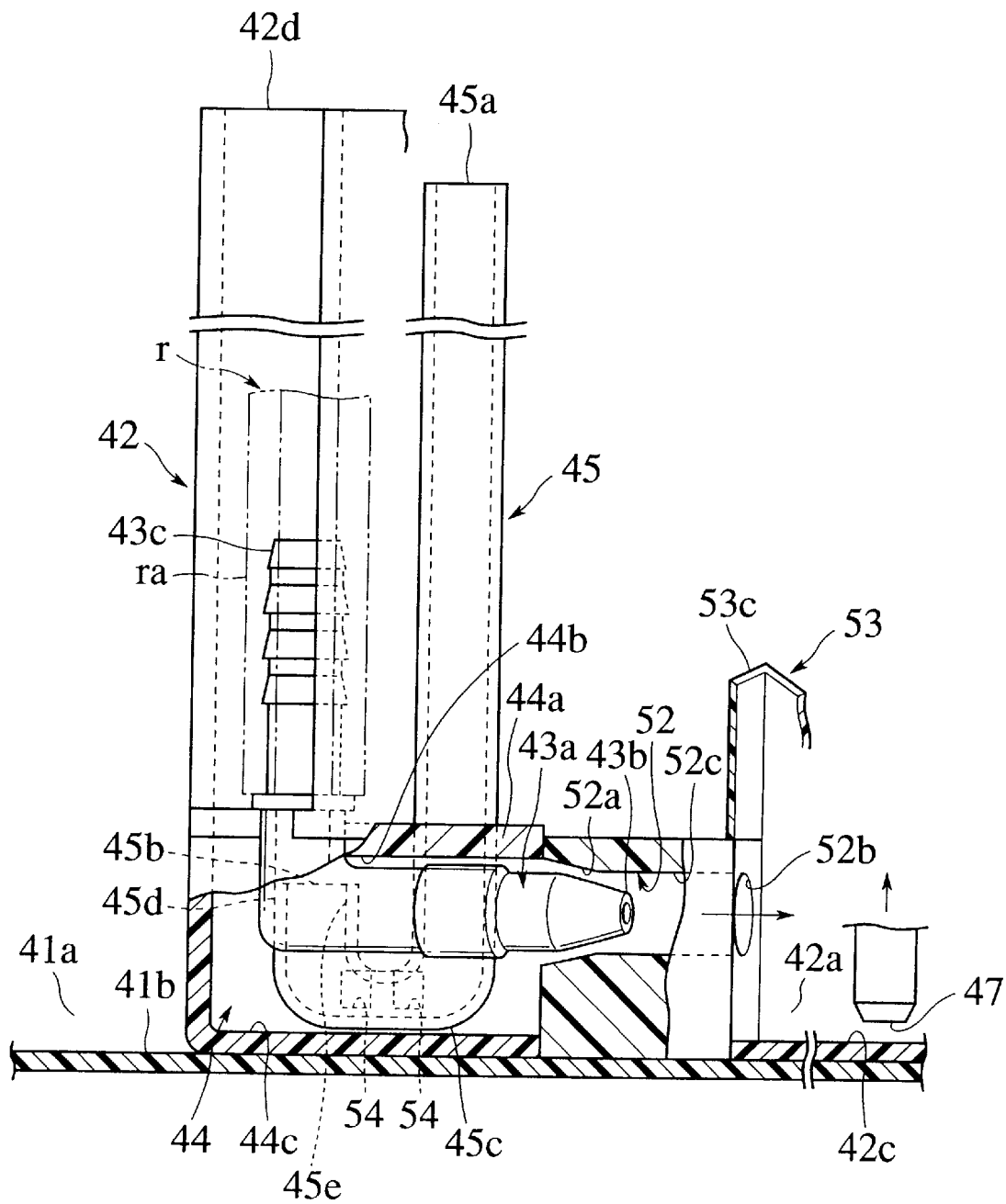
FIG. 12 is a partly cross sectional view in correspondence to FIG. 10 which shows a fuel chamber in accordance with a modified embodiment of the second embodiment of the present invention.

FIG. 12 shows a structure of a fuel chamber in accordance with a first modified embodiment of the second embodiment of the present invention.

In this case, the same reference numerals are attached to the same elements as or similar elements to the elements shown in the second embodiment.

At first, a structure of the modified embodiment will be described below. The front end opening 45b of the lower portion of the circulating pipe 45 is once extended to the portion adjacent to the bottom surface portion 44c of the pressure reduction chamber 44a, and is connected by the bending portion 45c upward bent substantially at 180 degrees, and the front end portion 45d is extended to the portion close to the chamber end opening portion 52b, thereby opening the front end opening 45e upward.

Next, an operation in accordance with the modified embodiment will be described below.

In the embodiment structured in the above manner, since the front end portion 45d of the lower opening 45b of the circulating pipe 45 is bent upward, the fuel stays within the bending portion 45c between the front end portion 45d and the circulating pipe main body so that the lower end of the circulating pipe 45 is closed.

Accordingly, since the air is not sucked from the circulating pipe 45, the negative pressure generated by introducing the return fuel circulated toward the fuel tank end into the introduction port portion 43a does not escape from the inner portion of the pressure reduction chamber 44, so that the fuel within the fuel tank main body 41a is introduced into the pressure reduction chamber 44 through the fuel tank end communicating holes 54 and 54 and is fed out into the fuel chamber main body 42a through the hole portion 52 from the pressure reduction chamber 44.

Since the other structures and operations are substantially the same as those of the second embodiment, the explanation thereof will be omitted.

Figure 13:
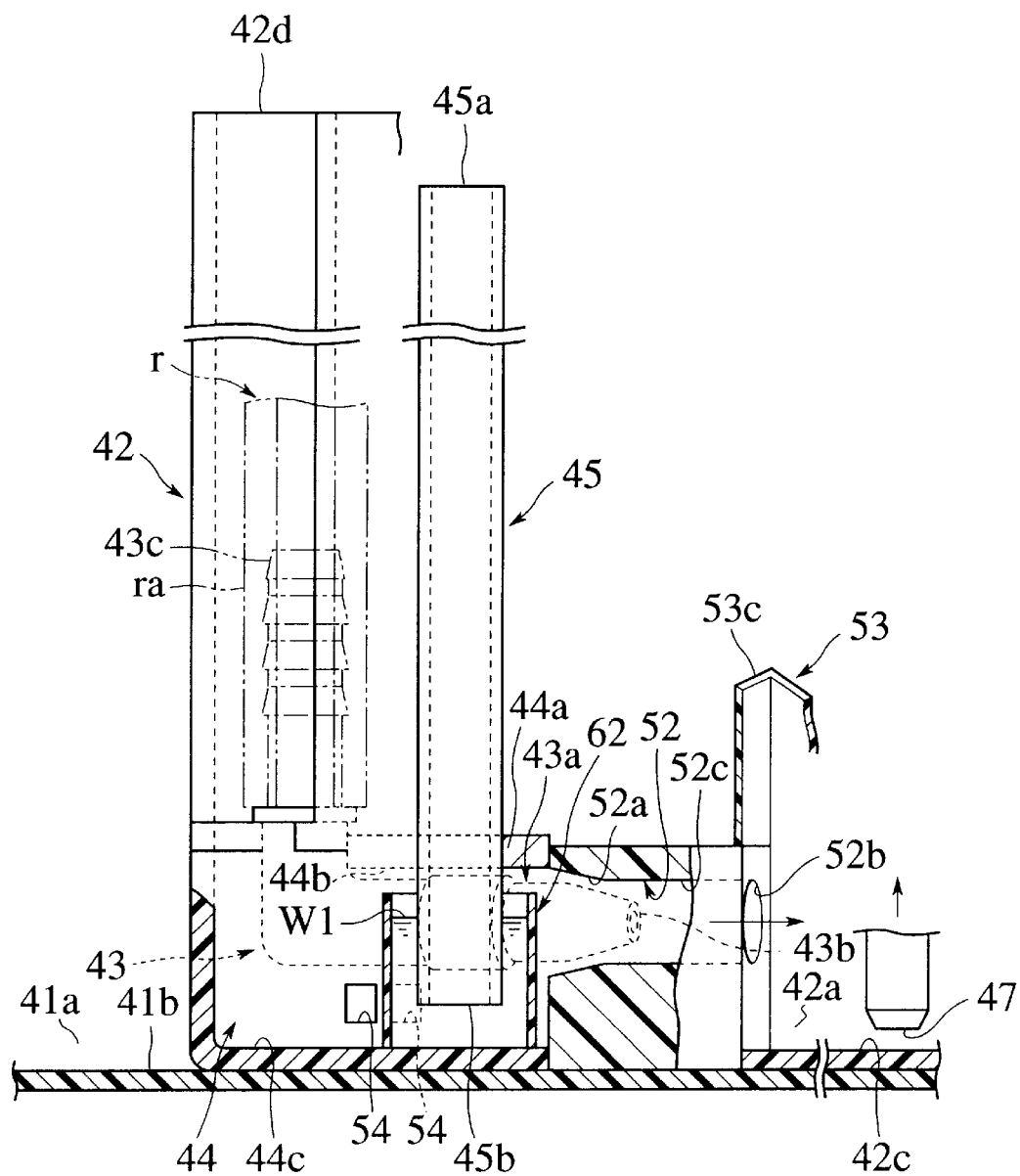
FIG. 13 is a partly cross sectional view in correspondence to FIG. 10 which shows a fuel chamber in accordance with another modified embodiment of the second embodiment of the present invention.

FIG. 13 shows a structure of a fuel chamber in accordance with a second modified embodiment of the second embodiment of the present invention.

In this case, the same reference numerals are attached to the same elements as or similar elements to the elements shown in the second embodiment.

At first, a structure of the modified embodiment will be described below. A fuel storage tank 62 is provided in the bottom surface portion 44c within the pressure reduction chamber 44. The fuel storage tank 62 is structured such as to have a bottom and no top so as to maintain a predetermined height of a liquid surface w1 even when the liquid surface of the fuel within the pressure reduction chamber 44 is lowered. Then, the front end of the lower end opening 45b of the circulating pipe 45 is inserted into the fuel storage tank 62 from the above and is immersed into the fuel within the fuel storage tank 62.

Next, an operation in accordance with the modified embodiment will be described below.

In the embodiment structured in the above manner, since the front end portion of the lower end opening 45b of the circulating pipe 45 is immersed into the fuel storage tank 62 provided within the pressure reduction chamber 44.

Accordingly, since the fuel within the fuel storage tank 62 closes the inner portion of the front end of the lower end opening 45b and the air is not sucked from the circulating pipe 45, the introduction port portion 43a introduces the return fuel circulated into the fuel tank 1, so that the generated negative pressure does not escape from the inner portion of the pressure reduction chamber 15.

Therefore, the fuel within the fuel tank main body 41a is introduced into the pressure reduction chamber 44 through the fuel tank end communicating holes 54 and 54 and is fed out within the fuel chamber main body 42a through the hole portion 52 from the pressure reduction chamber 44.

Since the other structures and operations are substantially the same as those of the second embodiment, the explanation thereof will be omitted.

Figure 14:
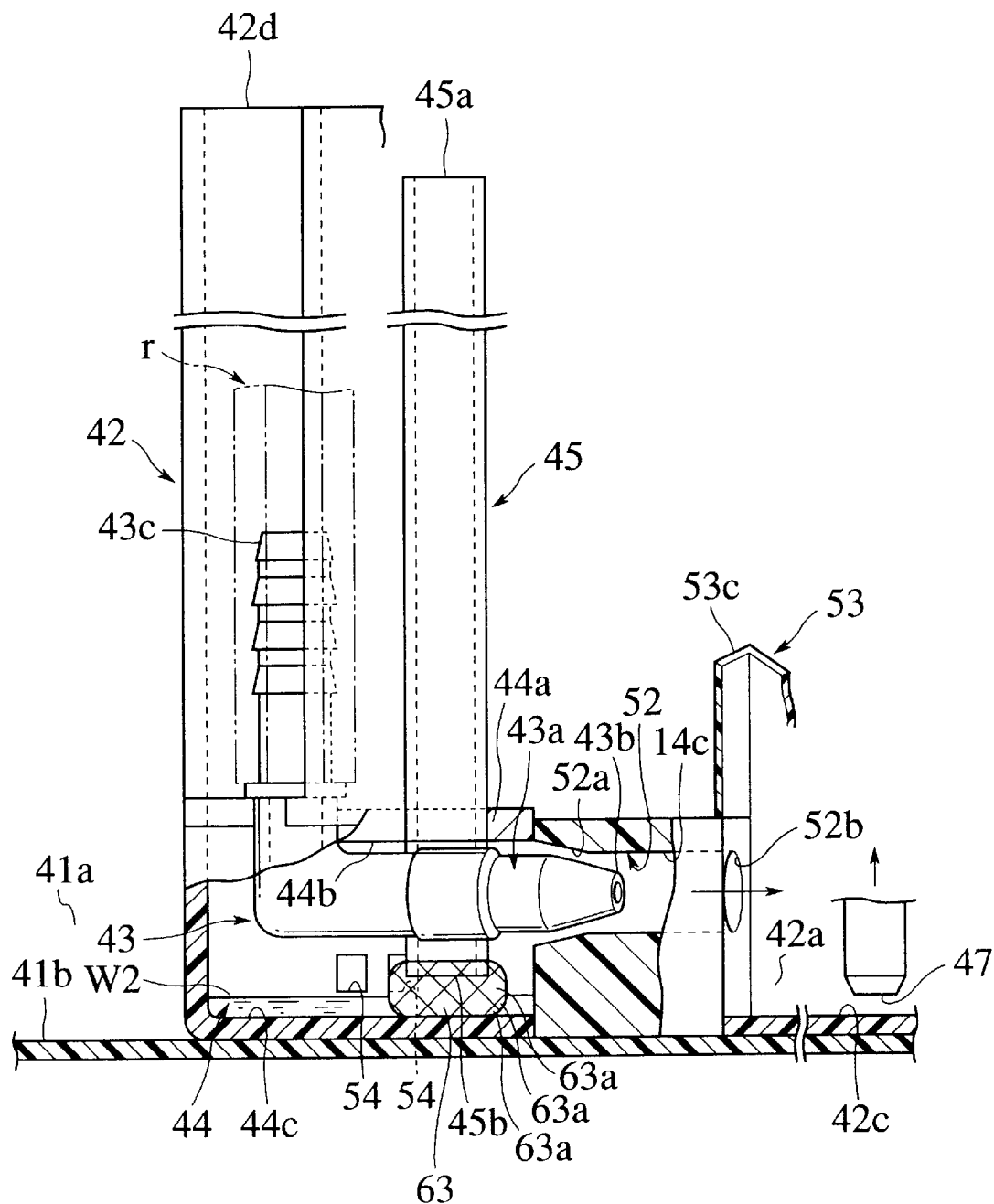
FIG. 14 is a partly cross sectional view in correspondence to FIG. 10 which shows a fuel chamber in accordance with the other modified embodiment of the second embodiment of the present invention.

FIG. 14 shows a structure of a fuel chamber in accordance with a third modified embodiment of the second embodiment of the present invention.

In this case, the same reference numerals are attached to the same elements as or similar elements to the elements shown in the second embodiment.

At first, a structure of the modified embodiment will be described below. A filter mesh member 63 is disposed in the front end of the lower end opening 45b of the circulating pipe 45. The filter mesh member 63 has a plurality of narrow holes 63a, the narrow holes 63a flow the fuel through under a permeating pressure higher than a predetermined pressure so as to serve as a filter, and under a permeating pressure lower than the predetermined pressure, the fuel is impregnated into the narrow holes 63a and is held due to a surface tension of itself, thereby preventing the air from passing through.

Next, an operation in accordance with the modified embodiment will be described below.

In the embodiment structured in the above manner, since the permeating pressure is high when the fuel chamber main body 42a is filled with the fuel and the circulated fuel is flown through the circulating pipe 45, the filter mesh member 63 passes the downward flown fuel through and introduces into the pressure reduction chamber 44, and substantially the same manner as the second embodiment, the circulated fuel is fed out toward the inner portion of the fuel chamber main body 42a from the hole portion 52 with priority.

Then, even when a height of a liquid surface w2 of the fuel within the pressure reduction chamber 44 is descended together with the reduction of the fuel within the fuel tank main body 41a, the filter mesh member 62 disposed in the front end of the lower end opening 45b of the circulating pipe 45 impregnates the fuel, so that the fuel is held within the narrow holes 63a due to a surface tension of the fuel itself and the narrow holes 63a are closed. Accordingly, the air is not sucked from the circulating pipe 45.

Accordingly, since the generated negative pressure does not escape from the inner portion of the pressure reduction chamber 44 by introducing the fuel circulated toward the fuel tank end into the introduction port portion 43a, the fuel within the fuel tank main body 41a is introduced into the pressure reduction chamber 44 through the fuel tank end communicating holes 54 and 54 and is fed out within the fuel chamber main body 42a through the hole portion 52 from the pressure reduction chamber 44.

Since the other structures and operations are substantially the same as those of the second embodiment, the explanation thereof will be omitted.

Figure 15:
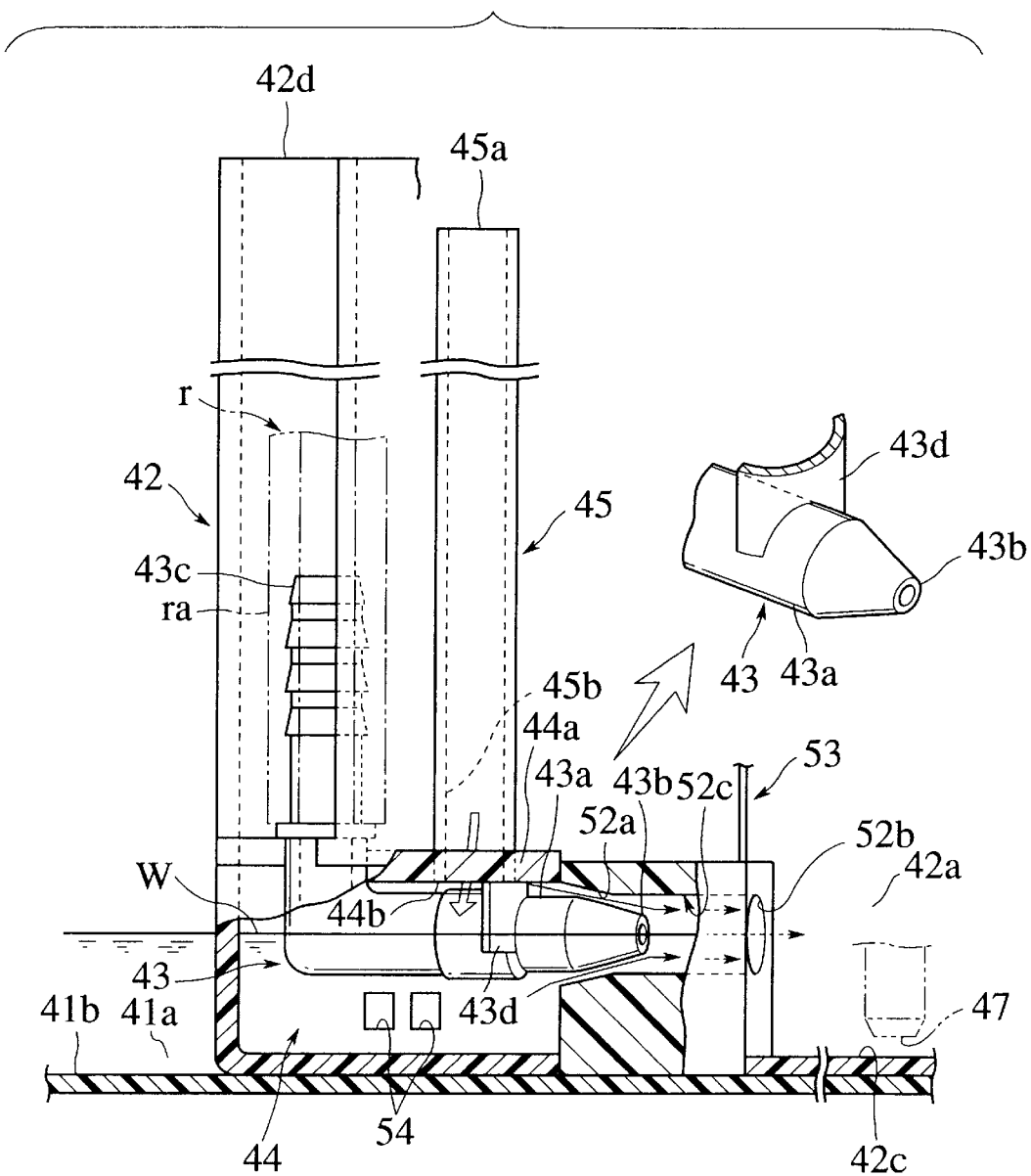
FIG. 15 is a partly cross sectional view and a mainly enlarged view in correspondence to FIG. 10 which shows a fuel chamber in accordance with the other modified embodiment of the second embodiment of the present invention.

FIG. 15 shows a structure of a fuel chamber in accordance with a fourth modified embodiment of the second embodiment of the present invention. In this case, the same reference numerals are attached to the same elements as or similar elements to the elements shown in the second embodiment.

In this structure, the lower end opening 45b of the circulating pipe 45 is substantially the same level as the lower surface end 44b of the upper wall portion 44a, however, the structure is made such that the wall 43d for preventing the air entrainment from the circulating pipe 45 end is integrally formed in the introduction port portion 43a of the jet nozzle 43 in such a manner as to form an extended portion of the circulating pipe 45, thereby substantially forming the circulating pipe 45 as an extension from the lower surface end 44b of the upper wall portion 44a.

Since the other structures and operations are substantially the same as those of the second embodiment, the explanation thereof will be omitted.

Figure 16:
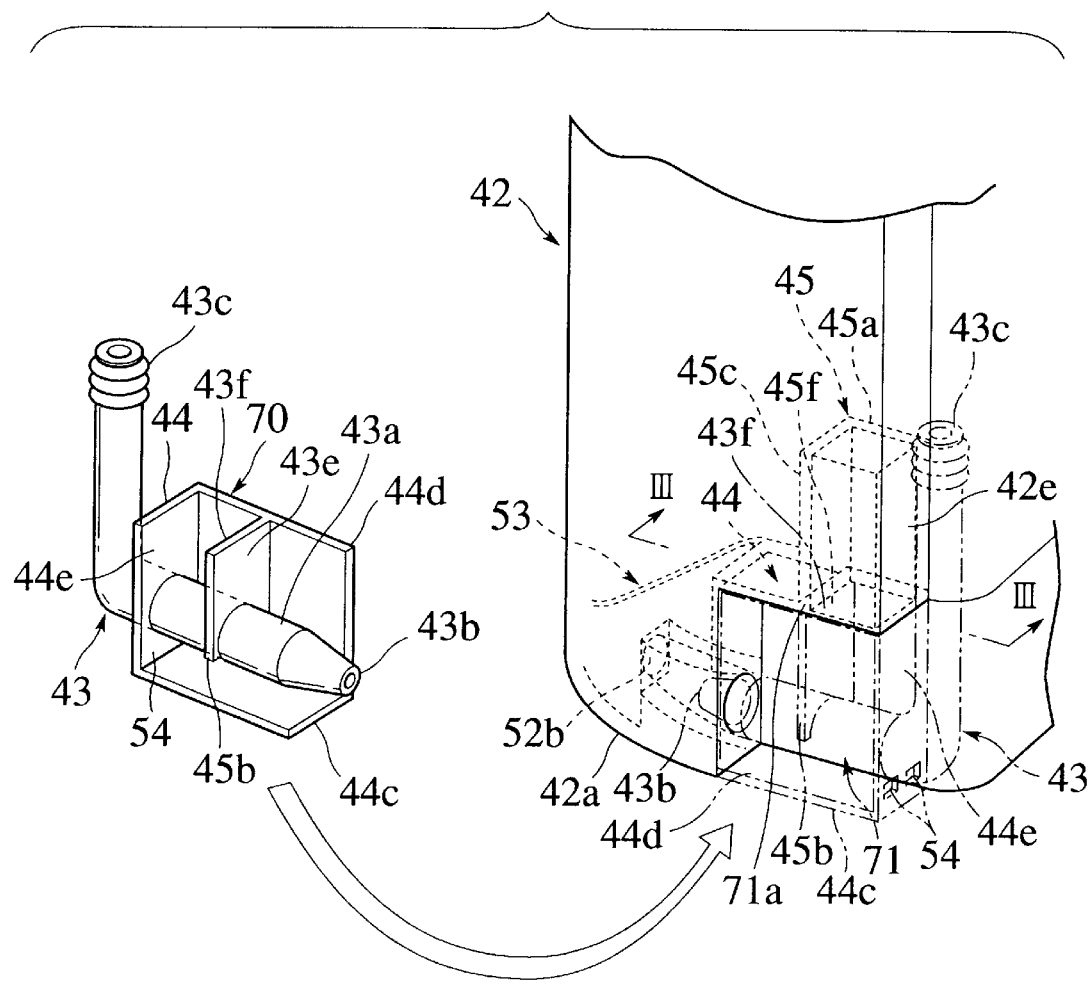
FIG. 16 is a mainly perspective view which shows an construction of a fuel chamber in accordance with the other modified embodiment of the second embodiment of the present invention.
Figure 17:
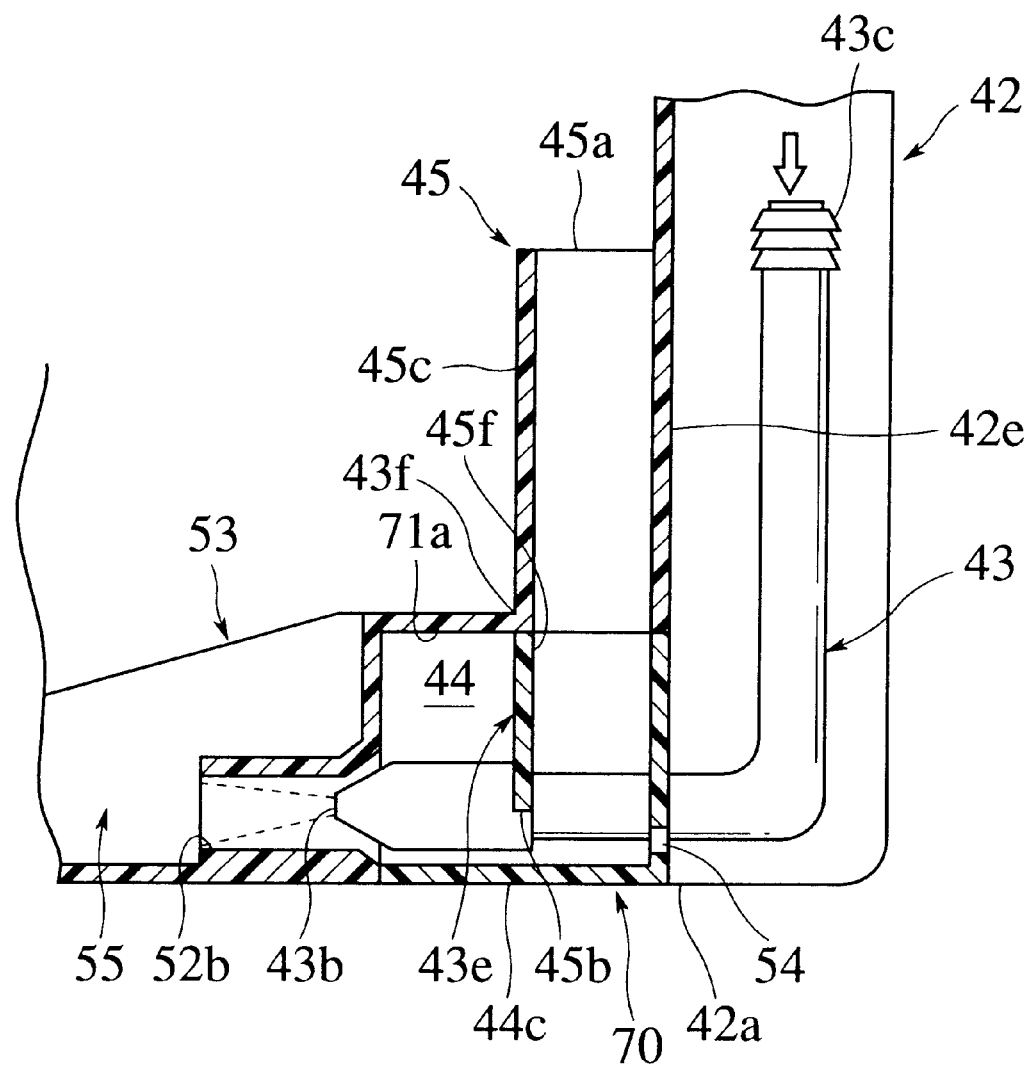
FIG. 17 is a cross sectional view along a line III—III in FIG. 16 which shows the fuel chamber.

FIGS. 16 and 17 show a structure of a fuel chamber in accordance with a fifth modified embodiment of the second embodiment of the present invention. In this case, the same reference numerals are attached to the same elements as or similar elements to the elements shown in the second embodiment.

At first, a structure will be described below. In the modified embodiment, as shown in FIG. 16, a introduction port module 70 having the bottom surface 44c of the pressure reduction chamber 44, the outer peripheral surface 44d, the rear surface 44e, the jet nozzle 43, the introduction port portion 43a thereof and the wall portion 43e integrally formed is separately formed from the fuel chamber main body 42a. Among these, in accordance with the modified embodiment, the wall portion 43e is formed substantially in a planner plate shape extending along the rear surface 44e substantially in parallel thereto.

The introduction port module body 70 is insertedly assembled into the recess portion 71 recessed in lower end corner portion of the fuel chamber main body 42a, and the circulating pipe 45 is fitted into the recess portion 71 communicating with the top surface 71a, so that the pressure reduction chamber 44 is formed.

Further, the lower end 45b of the circulating pipe 45 is formed by connecting the wall portion 43e integrally formed in the introduction port portion 43a with the portion 45c disposed within the fuel chamber main body 42a among the circulating pipe 45, and in the assembled state of the introduction port module body 70 and the circulating pipe 45 to the fuel chamber main body 42a, it is structured such that the horizontal positions of the edge portion of the lower end opening end of the portion 45c and the upper edge portion of the wall portion 43e are substantially correspond with each other in a fitting state of the introduction port module body 70.

Next, an operation in accordance with the modified embodiment will be described below.

In the modified embodiment, as shown in FIG. 16, the introduction port module body 70 is fitted into the recess portion 71 recessed in the lower end corner portion of the fuel chamber main body 42a, whereby the pressure reduction chamber 44 is formed.

Accordingly, an open surface of the introduction port module body 70 having the bottom surface 44c of the pressure reduction chamber 44, the outer peripheral surface 44d, the rear surface 44e, the jet nozzle 43, the introduction port portion 43a thereof and the wall portion 43e integrally formed is closed by the upper surface 71a of the recess portion 71 in the fuel chamber main body 42a and the like, whereby the pressure reduction chamber 44 substantially in a sealed state can be easily formed.

Due to the assembling, the edge portion 45f of the open end of the lower end 45b in the circulating pipe 45 having the upper surface 71a communicated therewith and the upper edge portion 43f of the wall portion 43e are opposed to each other, the horizontal positions of the wall portion 42e of the fuel chamber main body 42a and the rear surface portion 44e substantially correspond with each other, and the vertical passage formed by the wall portion 43e integrally formed in the introduction port portion 43a is connected with the portion 45c disposed within the fuel chamber main body 42a among the circulating pipe 45, in the assembling state of the introduction port module body 70.

Accordingly, the shape of the fuel chamber main body 42a end can be obtained by forming the recess portion 71, that is, its relatively simple shape can be obtained, so that a forming performance can be made easy, and the introduction port module body 70 is formed substantially in a planner plate shape, especially with respect to the wall portion 43e, extending along the rear surface 44e substantially in parallel thereto in such a manner as to easily take the wall portion 43e out from a mold in the forming by molding, so that the lower end 45b of the circulating pipe 45 can be extended to the inner and lower direction of the pressure reduction chamber 44 while keeping the forming performance further good.

Further, since the wall portion 43e is integrally formed with the introduction port module body 70 together with the introduction port portion 43a of the jet nozzle 43, an increase of a number of the parts can be restricted, so that the module can be easily assembled only by fitting the introduction port module body 70 to the recess portion 71.

Since the other structures and operations are substantially the same as those of the second embodiment, the explanation thereof will be omitted.

As mentioned above, the second embodiment and the modified embodiments thereof are described in detail with reference to the drawings, however, the concrete structure is not limited to these, and modifications in the design will be included in the present invention within the scope of the present invention.

For example, in the second embodiment, the lower end opening 45*b* of the circulating pipe is extended in maximum to substantially the same height as the forming position of the communicating holes 54 and 54 close to the fuel tank, however, the structure is not particularly limited to this, for example, the lower end opening 45*b* may be formed in such a manner as to be disposed at a position lower than the forming position of the communicating holes 54 and 54 close to the fuel tank.

Further, in accordance with the fifth modified embodiment, the wall portion 43*e* integrally formed with the introduction port module body 70 is extended along the rear surface 44*e* substantially in parallel thereto so as to be easily taken out from the mold in the forming by molding, however, the structure is not particularly limited to this, for example, as in the fourth modified embodiment, in the case that it is desired that the cross sectional shape of the part within the chamber of the circulating pipe 45 is formed substantially in a cylindrical shape, any shape can be employed as far as the lower end 45*b* is extended downward from the upper wall portion 44*a* of the pressure reduction chamber 44 such as substantially half cylindrical shape or the like by taking the shape of the circulating pipe 45 into consideration.

A third embodiment in accordance with the present invention will be described below with reference to the attached drawings.

FIGS. 18 to 22 show a structure of a fuel chamber in accordance with the third embodiment of the present invention.

At first, the structure will be described below. In accordance with the third embodiment, a fuel chamber 82 made of resin corresponding to a swirling and storage tank fixed to a bottom portion 81*b* of a fuel tank main body 81*a* storing a fuel is provided in a fuel tank 81 for a vehicle.

The fuel chamber 82 is formed substantially in a cylindrical shape having a bottom and no top, and a peripheral wall portion 82*b* is formed in a periphery of a fuel chamber main body 82*a*. Mounting pieces 82*d* and 82*e* are provided in a side surface of the peripheral wall portion 82*b*.

Further, a hole portion 92 corresponding to a communicating hole communicating and introducing the fuel within the fuel tank body 81*a* is formed in the peripheral wall portion 82*b*. The pump suction port 87 is faced near the bottom surface portion 82*c* within the fuel chamber main body 82*a*.

The hole portion 92 is structured such as to introduce the fuel stored within the fuel tank main body 81*a* into the fuel chamber main body 82*a*.

Further, a fuel passage 95 determined in the fuel chamber main body 82*a* is formed by a backward flow prevention wall 93 formed along the peripheral wall portion 82*b*, for example, formed in a half circular arc shape and provided as one element of a backward flow prevention portion 90. The backward flow prevention wall 93 is mainly constituted by an inclined upper edge portion 93*b* inclined toward the front end portion 93*a* with a downward inclination, and a standing portion 93*c* stood in the rear end of the inclined upper edge portion 93*b* and above the forming position of the hole portion 92.

Then, an inlet portion of the fuel passage 95 is constituted by the hole portion 92.

Further, a high position feeding out portion 96 of the backward flow prevention portion 90 is disposed substantially at an opposite position with respect to the fuel chamber main body 82*a* at the peripheral wall portion 82*b* in which the hole portion 92 is formed, in an outlet portion of the fuel passage 95 toward the fuel chamber main body 82*a*.

Figure 18:
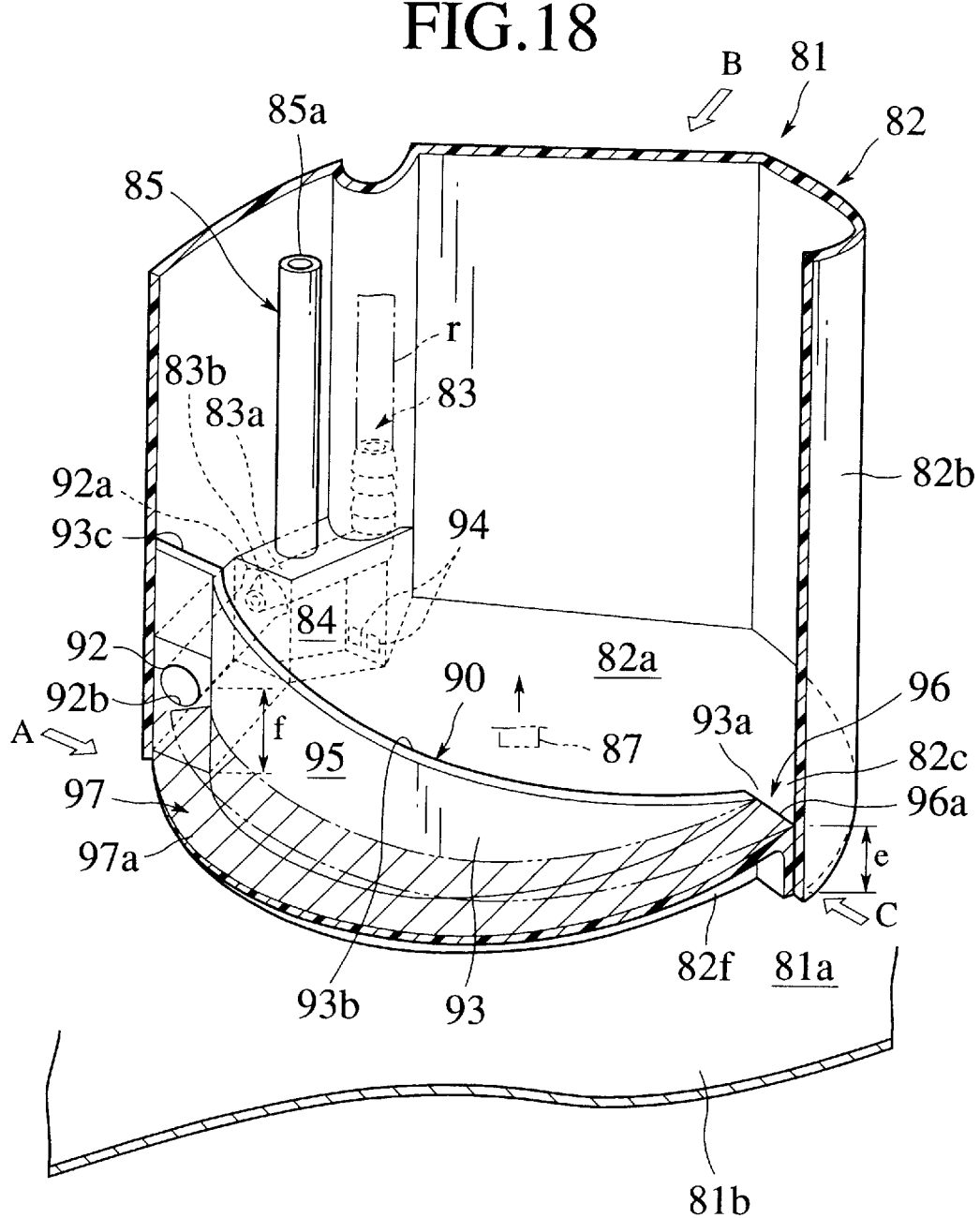
FIG. 18 is a partly cross sectional perspective view which shows a fuel chamber in accordance with a third embodiment of the present invention.
Figure 19:
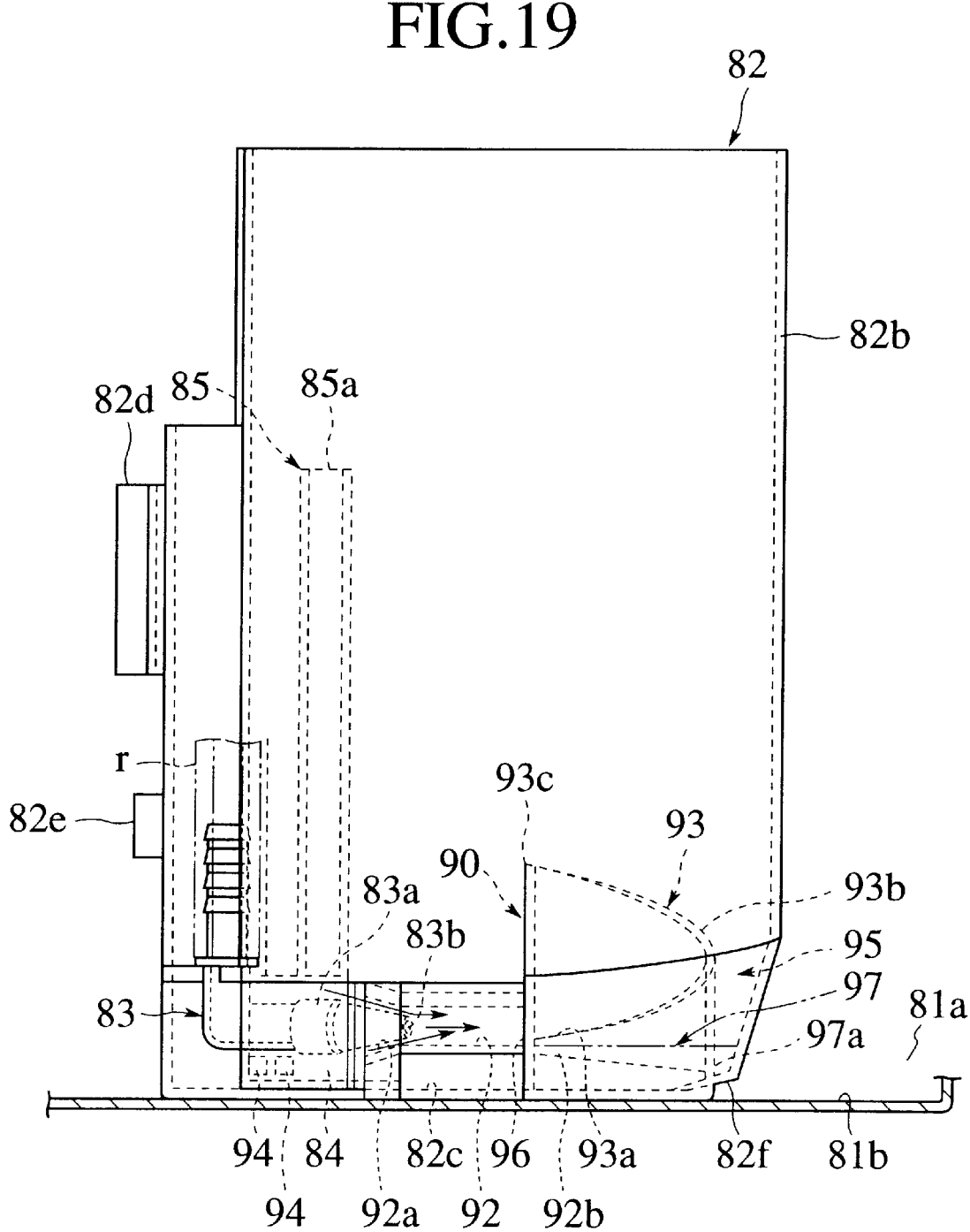
FIG. 19 is a side elevational view of the fuel chamber as a fuel chamber main body is seen from an arrow A direction in FIG. 22 in accordance with the same.
Figure 20:
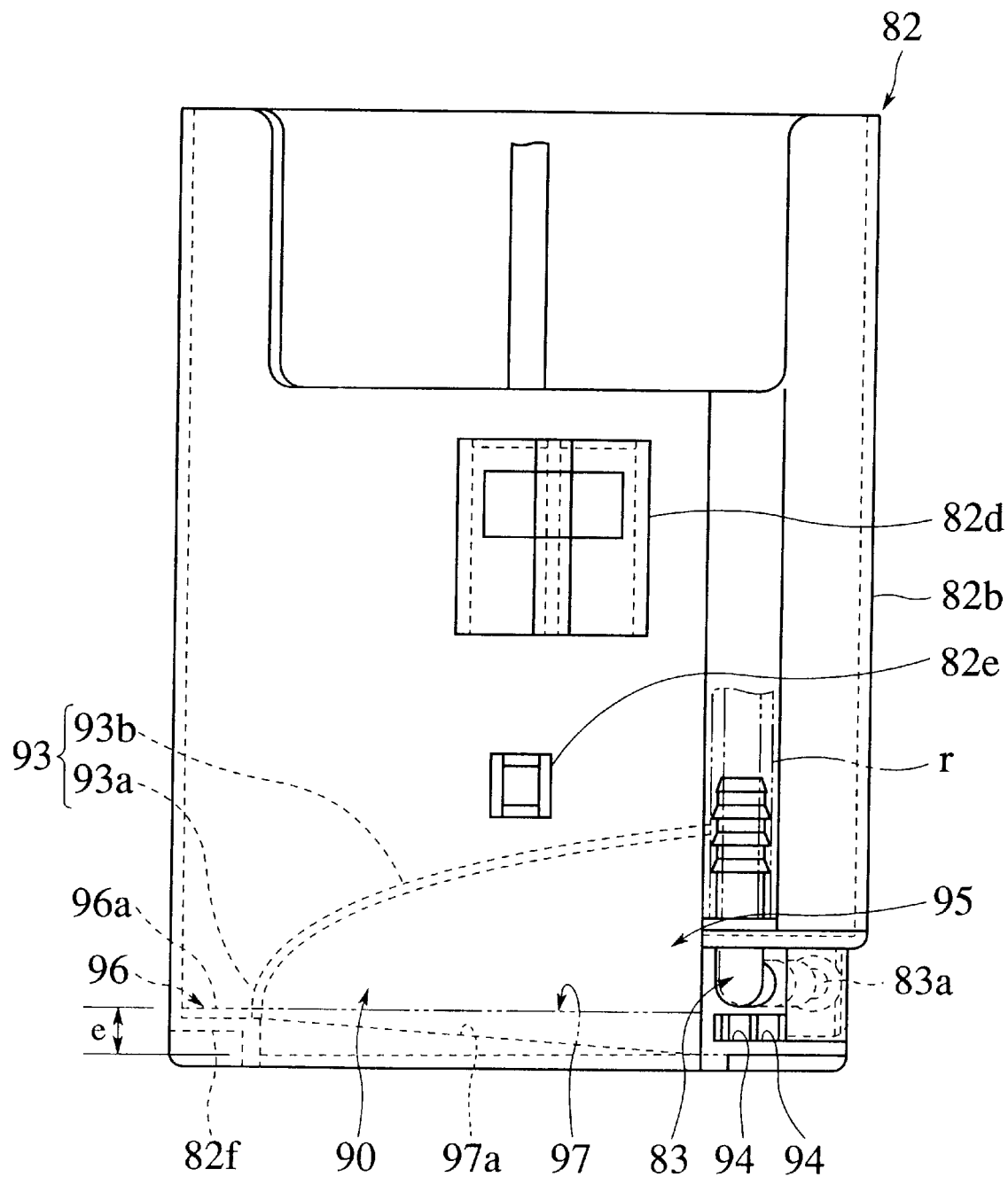
FIG. 20 is a side elevational view of the fuel chamber as a fuel chamber main body is seen from an arrow B direction in FIG. 22 in accordance with the same.
Figure 21:
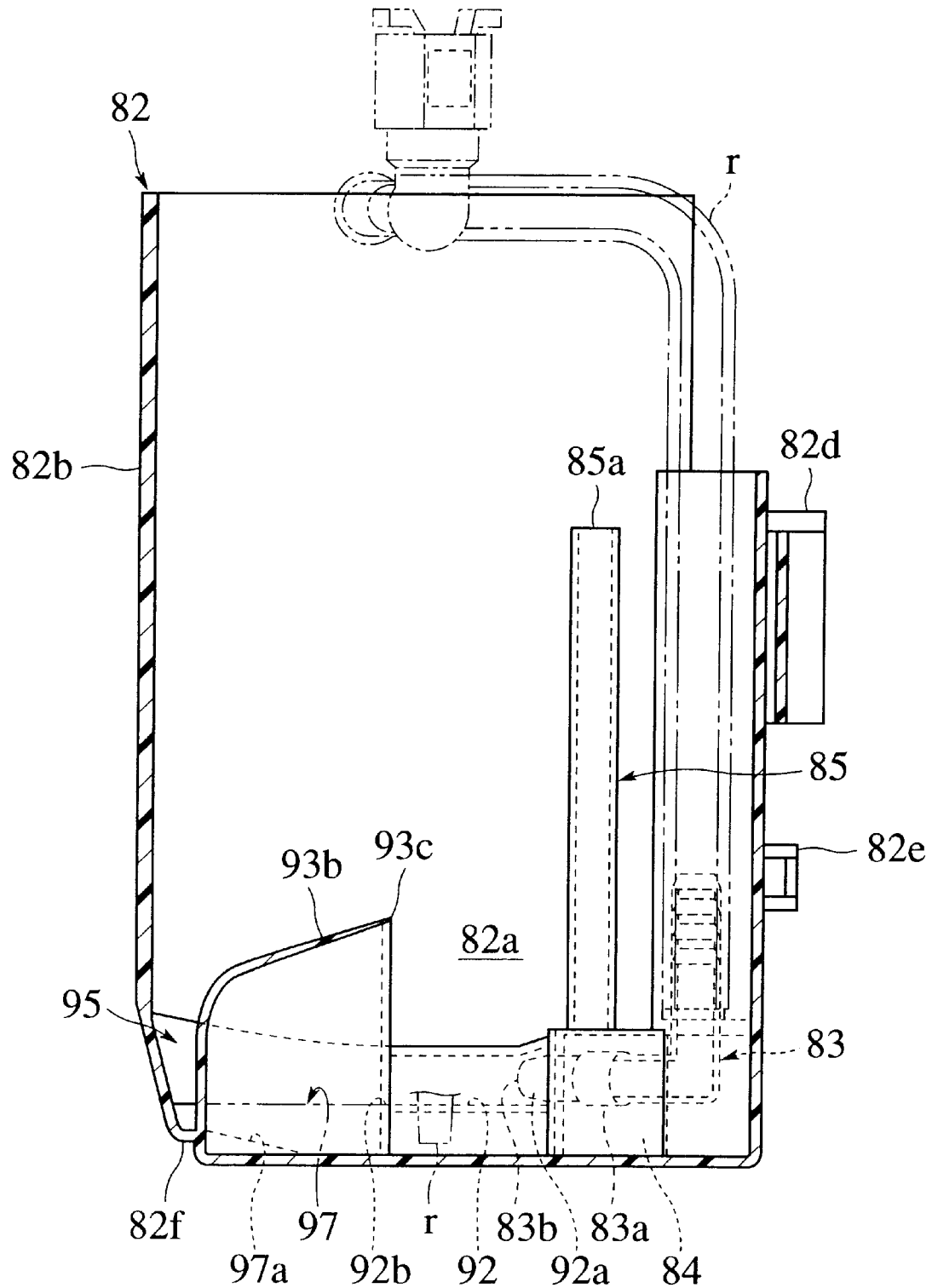
FIG. 21 is a cross sectional view along a line IV—IV in FIG. 22 which shows the fuel chamber in accordance with the same.
Figure 22:
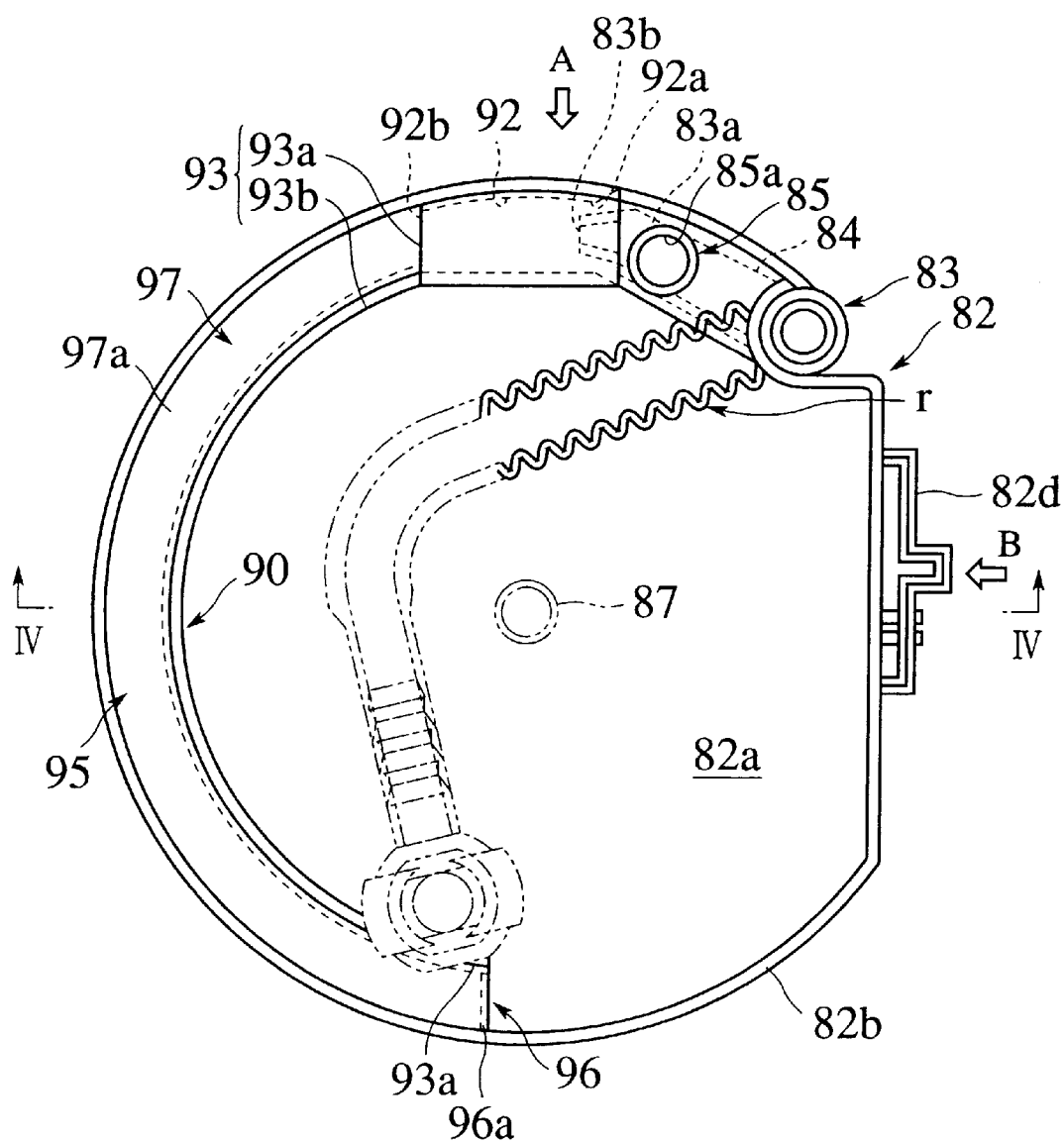
FIG. 22 is a top elevational view of the fuel chamber as a fuel chamber main body is seen from an upper portion in accordance with the same.

The high position feeding out portion 96 has a front end portion 93*a* of the backward flow prevention wall 93 and an upper end edge 96*a* connecting to the peripheral wall portion 82*b* at a position witch is higher than the bottom surface portion 82*c* of the fuel chamber main body with height h as shown in FIGS. 18 to 20, so that it is structured such that the fuel in the bottom surface portion 82*c* of the fuel chamber main body 82*a* is prevented from flowing backward from the hole portion 92 in an inclined state of the liquid surface of the fuel.

Then, by setting the forming position of the hole portion 92 to be a height f higher than the bottom surface portion 82*c* of the fuel chamber main body, a fuel storage recess portion 97 for storing the fuel in the portion corresponding to the lower portion of the fuel passage 95 is disposed between the upper end edge 96*a* of the backward flow prevention portion and the forming position of the hole portion 92 of the peripheral wall portion 82*b*.

The fuel storage recess portion 97 is formed, for example, substantially in a half circular arc shape in a horizontal cross section and substantially in a recessed groove shape in a cross section in a radial direction of the chamber between the backward flow prevention wall 93, the high position feeding out portion 96 and the peripheral wall portion 82*b* of the chamber main body by setting the forming position of the hole portion 92 to be higher than the bottom surface portion 82*c* of the chamber main body. Further, a recess-shaped notch portion 82*f* is formed in the bottom portion of the chamber main body 82*a* close to the lower surface end of the fuel storage recess portion 97.

A gentle slope having a downward inclination toward the lower portion of the forming position of the hole portion 92 from the upper end edge 96*a* of the backward flow prevention portion is given to the bottom surface portion 97*a* of the fuel storage recess portion 97. Accordingly, it is structured that the height of the bottom surface portion 97*a* of the fuel storage recess portion 97 becomes substantially the same height as the height of the bottom surface portion 82*c* of the fuel chamber main body 82*a* below the forming position of the hole portion 92.

Further, in accordance with the third embodiment, it is formed such that the forming position of the hole portion 92 becomes a position higher than the forming position of the upper end edge 96*a* of the backward flow prevention portion by setting the height f from the bottom surface portion 82*c* of the forming position of the hole portion 92 to be higher than the height e from the bottom surface portion 82*c* of the upper end edge 96*a* of the backward flow prevention portion.

Then, the hole portion 92 is communicated with the pressure reduction chamber 84 provided outside the peripheral wall portion 82*b*. Tank end communicating holes 94 and 94 communicating with the inner portion of the fuel tank main body 81*a* are formed in the outer lower portion of the pressure reduction chamber 84. The tank end communicating holes 94 and 94 are formed at a position close to the bottom surface portion 81*b* in such a manner as to be lower than the forming position of the hole portion 92.

A jet nozzle 83 of a blowing member formed substantially in an L shape and introducing the return fuel returned toward the fuel tank 81 through the return pipe r is inserted and disposed in the pressure reduction chamber 84.

A introduction port portion 83*a* corresponding to an introduction port is formed in the jet nozzle 83, and a front end 83*b* of the introduction port portion 83*a* is provided in such a manner as to face with the tapered opening portion 92*a* formed in the rear end of the hole portion 92.

Then, a fuel feeding out direction of the introduction port portion 83*a* is structured in such a manner as to entrain and discharge the fuel within the pressure reduction chamber 84 to an inner direction of the chamber main body 82*a* from the chamber end feeding out portion 92*b* of the hole portion 92 by giving a negative pressure generated by the injection pressure of the return fuel to the fuel within the fuel tank main body 81*a* introduced into the pressure reduction chamber 84 through the tank end communicating holes 94 and 94.

Further, a circulating pipe 85 communicated with the pressure reduction chamber 84 in the lower end opening is integrally provided in the upper portion of the pressure reduction chamber 84 in such a manner as to again introduce the fuel having relatively high temperature, within the fuel chamber main body 82*a* and flowing from the upper end opening 85*a*, into the pressure reduction chamber 84.

Next, an operation of the third embodiment will be described below.

Even when the liquid surface within the fuel tank body 81*a* is inclined at a time of turning, the high position feeding out portion 96 is formed at an opposite position of the hole portion 92, so that the liquid surface of the fuel within the fuel chamber main body 82*a* is prevented from overflowing the backward flow prevention wall 93 of the backward flow prevention portion 90 and the fuel is prevented from flowing out to the fuel tank main body 81*a* from the hole portion 92. Accordingly, a little amount of fuel is returned into the fuel tank main body 81*a* through the fuel flow passage 95, and substantially a predetermined amount of remaining fuel can be secured within the fuel chamber main body 82*a*.

Accordingly, since substantially the predetermined amount of fuel can be secured even when the liquid surface of the fuel is inclined to a different direction, the pump suction port 87 facing within the fuel chamber main body 82*a* is not exposed to an open air, so that the fuel can be efficiently sucked to an extent close to the terminal end.

Since the hole portion 92 formed in the peripheral wall portion 82*b* of the chamber main body mounted in the fuel tank bottom portion 81*b* is formed a height f higher than the bottom surface portion 82*c* of the chamber main body, the fuel within the fuel tank main body 81*a* passes through the fuel flow passage 95 via the hole portion 92 and is introduced into the fuel chamber main body 82*a*. At this time, since the fuel is introduced from the hole portion 92 formed at a high position to the bottom surface portion 82*c* at a low position, the fuel easily gets over the upper end edge 96*a* of the high position feeding out portion of the backward flow prevention portion 90.

Further, when the fuel within the fuel chamber main body 82*a* is reduced due to the reduction of the fuel within the fuel tank main body 81*a*, the fuel storage recess portion 97 provided between the upper end edge 96*a* of the backward flow prevention portion and the forming position of the chamber end feeding out portion 92*b* of the hole portion 92 stores the fuel. The fuel stored in the fuel storage recess portion 97 gets over the upper end edge 96*a* of the backward flow prevention portion due to the vibration or the inclination of the fuel chamber main body 82*a* and the like, thereby flowing out on the bottom surface portion 82*a* of the chamber main body at a low position.

Then, the fuel once introduced on the bottom surface portion 82*c* of the chamber main body at a low position is prevented from being again returned into the fuel storage recess portion 97 by means of the backward flow prevention wall 93 of the backward flow prevention portion 90, and is prevented from flowing backward from the hole portion 92.

Accordingly, the fuel can be sucked out to an extent further close to the terminal end.

Further, the front end 83*b* of the introduction port portion 83*a* introducing the fuel circulated into the fuel tank 81 is faced and disposed within the tapered opening portion 92*a* of the hole portion 92 of the peripheral wall portion 82*b* of the chamber main body.

Accordingly, as shown in FIG. 19, the negative pressure generated by the injection pressure of the return fuel fed out from the introduction port portion 83*a* is given to the fuel within the fuel tank 81. Accordingly, the fuel within the pressure reduction chamber 84 is entrained with the return fuel so as to be discharged to the inner direction of the chamber main body 82*a* from the chamber end feeding out port portion 92*b* of the hole portion 92.

Since the tank end communicating holes 94 and 94 formed in the fuel tank main body 81*b* end of the pressure reduction chamber 84 is formed at a position close to the bottom surface portion 81*b* in a lower manner, the fuel within the fuel tank main body 81*a* is always immersed into the pressure reduction chamber 84.

Accordingly, the fuel remaining close to the bottom surface portion 81*b* of the fuel tank main body is sucked by the injection pressure of the return fuel fed out from the front end 83*b* of the introduction port chamber 83*a* and is discharged to an inner direction of the fuel chamber main body 82*a* through the hole portion 92 disposed at a position higher than the bottom surface portion 82*c*.

Accordingly, the remaining fuel within the fuel tank main body 81*a* is further efficiently introduced into the fuel chamber main body 82*a* to an extent close to the terminal end so as to be sucked out from the pump suction port 87.

Then, in accordance with the third embodiment, since the forming position of the hole portion 92 is formed in a position higher than the forming position of the upper end edge 96*a* of the backward flow prevention portion, the fuel stored in the fuel storage recess portion 97 is not flown backward into the fuel tank main body 81*a* through the hole portion 92 even by the vibration or the inclination of the fuel chamber main body 82*a* or the like, and gets over the upper end edge 96*a* of the backward flow prevention portion so as to be flown out on the bottom surface portion 82*c* of the fuel chamber main body formed at a lower position.

Accordingly, the fuel can be further efficiently sucked out to an extent close to the terminal end.

Further, since the backward flow prevention portion 90 is constituted by a backward flow prevention wall 93 formed along the peripheral wall portion 82*b* from the forming position of the hole portion 92 to the substantially opposite position within the fuel chamber main body 82*a* and the high position feeding out portion 1 connecting a front end portion 93a of the backward flow prevention wall 93 and the peripheral wall portion 82b at a position higher than the bottom surface portion 82c of the fuel chamber main body, the fuel is prevented from being flown out to a direction of the fuel tank main body 81a from the hole portion 92 by the backward flow prevention wall 93 even when the liquid surface of the fuel within the fuel chamber main body 82a is inclined to any direction.

Further, since the forming position of the hole portion 92 is set to be higher than the bottom surface portion 82c of the fuel chamber main body and the groove shape is formed between the backward flow prevention wall 93, the high position feeding out portion 96 and the peripheral wall portion 82b of the chamber main body with respect to the fuel storage portion 97, the fuel within the fuel storage portion 97 is directly entrained without being in contact with the fuel having relatively a low temperature and disposed within the fuel chamber main body 82a even when the fuel having a high temperature is circulated from the hole portion 92, so that the fuel passes through the fuel passage substantially along half periphery and is mixed with being stirred up. Accordingly, even when the return fuel is fed out form the front end 83b of the introduction port portion 83a, a portion having a significantly high temperature is not generated and the vapor is prevented from generating.

Figure 23:
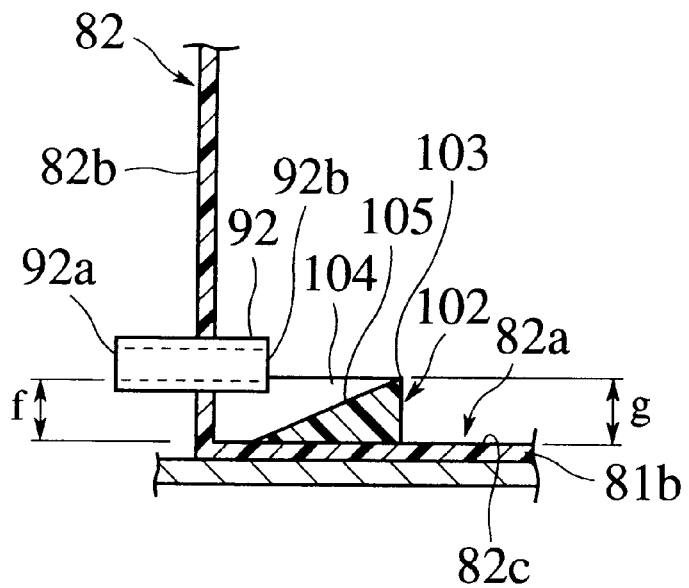
FIG. 23 is a partly sectional view along a line V—V in FIG. 24 which shows a fuel chamber in accordance with a modified embodiment of the third embodiment of the present invention.
Figure 24:
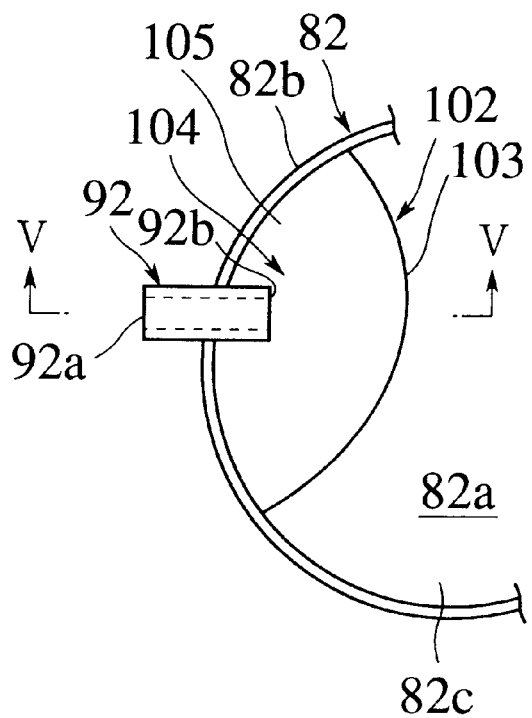
FIG. 24 is a top elevational view which shows a main part of the fuel chamber in accordance with the same.

FIGS. 23 and 24 show a structure of a chamber in accordance with a modified embodiment of the third embodiment of the present invention. In this case, the same reference numerals are attached to the same elements as or similar elements to the elements shown in the third embodiment.

In the structure of the fuel chamber in accordance with this modified embodiment, a backward flow prevention portion 102 is formed in substantially a fan shape expanding to an inside direction of the fuel chamber main body 82a from the forming position of the feeding out portion 92b close to the chamber of the hole portion 92.

A front end edge 103 formed substantially in a half circular arc shape and corresponding to a high position feeding out portion having substantially a constant height g from the bottom surface portion 82c is provided in the front end of the backward flow prevention portion 102 in such a manner as to connect both ends of the half circular arc to the peripheral wall 82b of the chamber main body.

A bottom surface portion 105 having a predetermined downward inclination is formed from the half circular arc front end edge 103 formed in the front end of the backward flow prevention portion 102 to the lower portion of the hole portion 92.

Then, the fuel storage recess portion 104 is formed between the half circular arc front end edge 103 in the backward flow prevention portion 102 and the peripheral wall 82b of the chamber main body in such a manner as to be capable of storing the fuel by being formed substantially in the recess cross section.

Next, an operation in accordance with the modified embodiment will be described below. In the structure of the fuel chamber of this construction, since the hole portion 92 formed in the peripheral wall portion 82b of the fuel chamber main body mounted on the fuel tank bottom portion 81b is formed a height f higher than the bottom surface portion 82c of the fuel chamber main body, the fuel within the fuel tank main body 81a is introduced into the chamber main body 82a through the hole portion 92. At this time, since the fuel is introduced toward the bottom surface portion 82c disposed at a position from the hole portion 92 formed at a high position, the fuel easily gets over the substantially half circular front end portion 103 corresponding to the high position feeding out portion of the backward flow prevention portion 102.

Further, when the fuel within the fuel chamber main body 82a is reduce due to the reduction of the fuel within the fuel tank main body 81a, the fuel storage recess portion 104 disposed between the substantially half circular arc front end portion 103 and the forming position of the chamber end feeding out portion 92b of the hole portion 92 stores the fuel. The fuel stored in the fuel storage recess portion 104 gets over the substantially half circular arc front end portion 103 due to the vibration or the inclination of the fuel chamber main body 82a or the like so as to be flown out on the chamber main body bottom surface portion 82c disposed at a low position.

Then, the fuel once introduced on the bottom surface portion 82c of the chamber main body disposed at a low position is prevented from again returning into the fuel storage recess portion 97 by means of the substantially half circular arc front end portion 103 and is prevented from flowing backward from the hole portion 92.

Accordingly, the fuel can be efficiently sucked out to an extent close to the terminal end.

Further, the backward flow prevention portion 102 is formed substantially in a fan shape expanding from the forming position of the hole portion 92 to the inside direction of the chamber main body and the fuel storage recess portion 104 is formed between the half circular arc front end edge 103 of the backward flow prevention portion 102 and the peripheral wall portion 82b of the chamber main body, the half circular arc front end edge 103 serves both the high position feeding out portion and the backward flow prevention portion, so that the backward flow prevention wall 93 can be omitted. Accordingly, the structure can be made simple and the manufacturing cost can be restricted from being increased.

Since the other structures and operations are the same as those of the third embodiment, the explanation thereof will be omitted.

As mentioned above, the third embodiment and the modified embodiments thereof in accordance with the present invention are described in detail, however, the concrete structure is not limited to the structure mentioned above and the structure can be modified within the scope of the present invention.

For example, in the third embodiment, the introduction port portion 83a is faced within the hole portion 92 and the fuel of the pressure reduction chamber 84 is fed out into the fuel chamber main body 82a by feeding out the return fuel, however, the structure is not limited to this, and for example, any structure such as the structure of feeding out only the fuel within the fuel tank main body 81a, or the structure of feeding out from the introduction port by using the other pump or the like so as to generate a negative pressure, or the like can be employed as far as the fuel storage recess portion 97 is formed by forming the hole portion 92 higher than the chamber main body bottom portion 82c.

Figure 25:
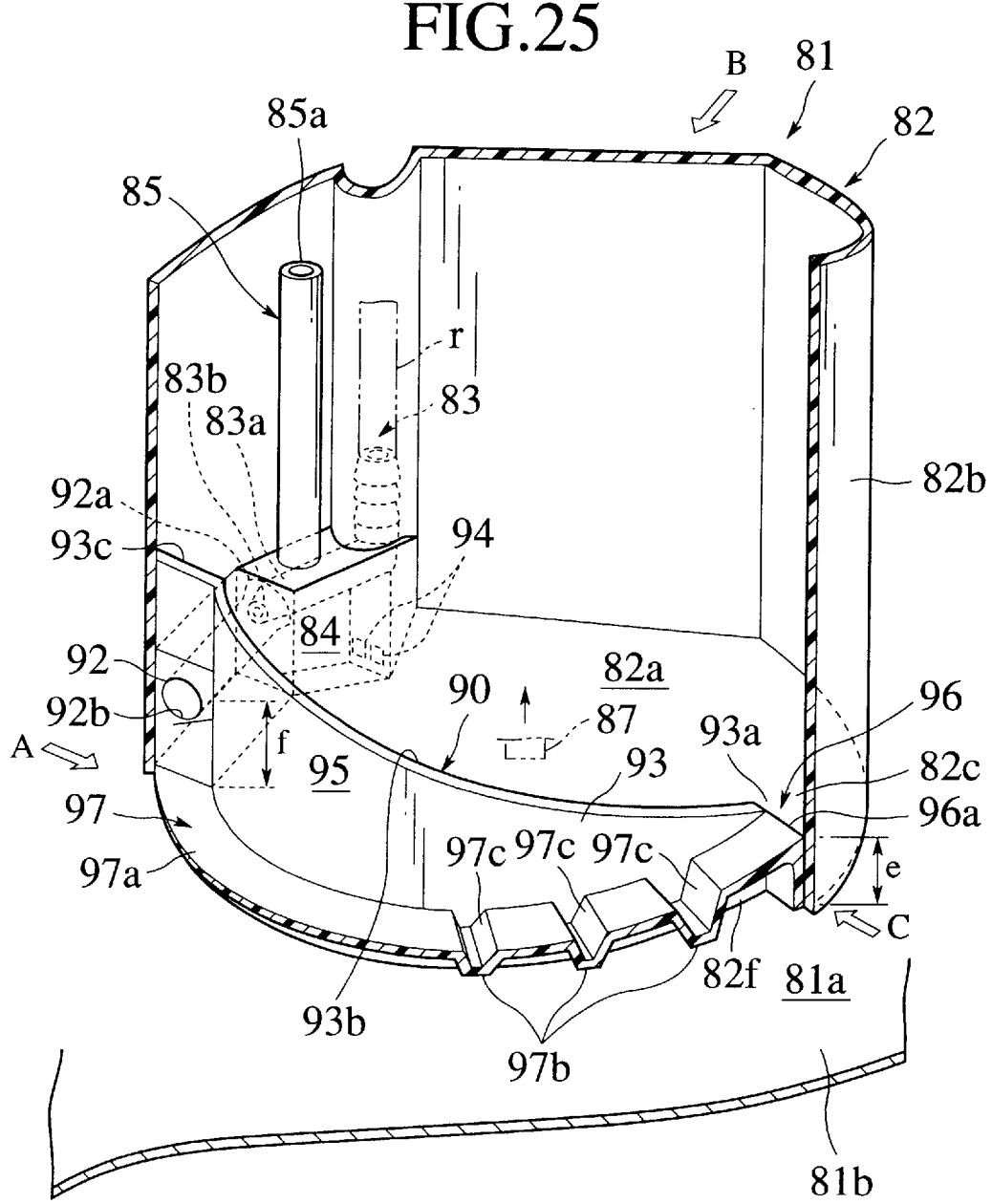
FIG. 25 is a partly cross sectional perspective view in correspondence to FIG. 18 which shows a fuel chamber in accordance with the other modified embodiment of the third embodiment of the present invention.

Further, as shown in FIG. 25, the structure may be made such that a recess portion 97b is formed in the bottom surface portion 97a of the fuel storage portion 97 so as to be served as a fuel dust remover for removing dusts within the fuel flowing over the fuel storage recess portion 97. In this case, it is preferable that the recess portion 97b has an inclined surface 97c in a direction along the flow of the fuel injected from the hole portion 92.

What is claimed is:

1. A fuel chamber for an automotive vehicle which is provided within a fuel tank of said automotive vehicle, introduces a fuel stored within said fuel tank to an inner portion thereof, and receives a fuel returned toward said fuel tank through a fuel pump, comprising:

a fuel chamber main body;

a hole portion provided in a lower portion of said fuel chamber main body and communicating an inner portion of said fuel chamber main body with an outer portion thereof;

a jet nozzle member having a front end portion inserted into said hole portion and injecting said fuel returned toward said fuel tank into said fuel chamber main body through said hole portion, in which a gap is formed between an outer peripheral surface of said front end portion and an inner peripheral surface of said hole portion;

a cover body covering at least a part of an upper periphery of said jet nozzle member and at least a part of an upper periphery of said hole portion, and forming a pressure reduction chamber decompressed in response to that said jet nozzle member injects said fuel returned toward said fuel tank through said hole portion; and a tubular circulating member having an upper end opening at a position lower than an upper end of said fuel chamber main body, having a lower end opening in such a manner as to communicate with an inner portion of said cover body, and circulating a fuel within said fuel chamber main body, wherein said fuel stored within said fuel tank is introduced into said fuel chamber main body through said gap portion in response to that said jet nozzle member injects said fuel returned toward said fuel tank into said fuel chamber main body through said hole portion, and said fuel within said fuel chamber main body is circulated through said hole portion by a pressure reduction of said pressure reduction chamber in response to that said jet nozzle member injects said fuel returned toward said fuel tank into said chamber main body through said hole portion.

2. A fuel chamber for an automotive vehicle according to claim 1, wherein a lower end wall for closing said jet nozzle member except a part in a lower portion thereof is formed in a lower end of said cover body.

3. A fuel chamber for an automotive vehicle according to claim 1, wherein said cover body is extended from an upper portion thereof toward a lower portion thereof in such a manner that a lower end thereof is disposed at a position lower than said hole portion and said lower end of said cover body is open.

4. A fuel chamber for an automotive vehicle according to claim 1, wherein said tubular circulating member is extended downward from a upper end of said cover body.

5. A fuel chamber for an automotive vehicle according to claim 4, wherein said tubular circulating member is extended downward from said upper end of said cover body in such a manner that a lower end thereof is disposed lower than a position of said hole portion.

6. A fuel chamber for an automotive vehicle according to claim 4, wherein said pressure reduction chamber is formed in such a manner as to cover a periphery of said jet nozzle member, and have a communicating hole for communicating with said fuel tank, said communicating hole being disposed at a position lower than a position of said hole portion, a fuel introduced into said fuel chamber main body is introduced into said fuel chamber main body through said gap portion after passing through said communicating hole of said pressure reduction chamber, and said tubular circulating member is extended downward from said upper end of said cover body in such a manner that said lower end thereof is disposed at a position upper than said position of said communicating hole and lower than said position of said hole portion.

7. A fuel chamber for an automotive vehicle according to claim 6, wherein a cross sectional area of a flow passage in said tubular circulating member is larger than a cross sectional area of a flow passage in said communicating hole.

8. A fuel chamber for an automotive vehicle according to claim 4, wherein said circulating member is structured such that a lower end thereof is bent in such a manner as to upward direct.

9. A fuel chamber for an automotive vehicle according to claim 4, wherein said pressure reduction chamber is formed in such a manner as to cover a periphery of said jet nozzle member, and said tubular circulating member is extended downward from said upper end of said cover body in such a manner that a lower end thereof is immersed into a fuel within said pressure reduction chamber.

10. A fuel chamber for an automotive vehicle according to claim 4, wherein a filter mesh member is provided in a lower end of said tubular circulating member.

11. A fuel chamber for an automotive vehicle according to claim 1, wherein a wall portion independently provided from said circulating member is connected to a lower end of said tubular circulating member so that the circulating passage of said tubular circulating member is substantially extended within said pressure reduction chamber.

12. A fuel chamber for an automotive vehicle according to claim 11, wherein said wall portion is integrally formed with said jet nozzle member.

13. A fuel chamber for an automotive vehicle according to claim 11, wherein said wall portion is integrally formed with said cover body.

14. A fuel chamber for an automotive vehicle which is provided within a fuel tank of said automotive vehicle, introduces a fuel stored within said fuel tank to an inner portion thereof, and receives a fuel returned toward said fuel tank through a fuel pump, comprising:

a fuel chamber main body;

a recess portion formed in such a manner as to be recessed with respect to an inner portion of said fuel chamber main body, in a corner portion of a lower end of said fuel chamber main body, and provided with a hole portion communicating an inner portion of said fuel chamber main body with an outer portion thereof;

a tubular circulating member having an upper end opening at a position lower than an upper end of said fuel chamber main body, having a lower end opening in such a manner as to communicate with said recess portion and circulating a fuel within said fuel chamber main body;

a jet nozzle member facing to said hole portion, and injecting said fuel returned toward said fuel tank into said fuel chamber main body through said hole portion; and a cover body covering a periphery of said recess portion together with said jet nozzle member, and having a communicating hole communicating with said fuel tank formed, wherein a pressure reduction chamber is formed by said cover body and said recess portion, said fuel stored within said fuel tank is introduced into said fuel chamber main body in response to that said jet nozzle member injects said fuel returned toward said fuel tank into said fuel chamber main body through said hole portion, and said fuel within said fuel chamber main body is circulated through said hole portion by a pressure reduction of said pressure reduction chamber in response to that said jet nozzle member injects said fuel returned toward said fuel tank into said fuel chamber main body through said hole portion.

15. A fuel chamber for an automotive vehicle according to claim 14, further comprising a pipe member connected to said jet nozzle member in such a manner as to supply said fuel returned toward said fuel tank to said jet nozzle member, wherein said cover body is formed in such a manner as to unite the bottom surface of said pressure reduction chamber, the outer peripheral surface of said pressure reduction chamber and said jet nozzle member to which said pipe member are connected.

16. A fuel chamber for an automotive vehicle according to claim 15, wherein said cover body is connected to the lower end of said tubular circulating member and a wall portion of said cover body is integrally formed in such a manner as to substantially extend a circulating passage of said circulating member within said pressure reduction chamber.

17. A fuel chamber for an automotive vehicle comprising:
    a fuel chamber main body mounted on a bottom portion of the fuel tank;
    a communicating hole formed on a peripheral wall portion of said fuel chamber main body and communicating a fuel within said fuel tank;
    a backward flow prevention portion having an upper end edge at a position higher than a bottom surface portion of said fuel chamber main body in an inner portion of said fuel chamber main body, and preventing a fuel in a bottom surface portion of said fuel chamber main body in the case that a fuel stayed in an inner portion of said fuel chamber main body is in a low level and in the state that a surface of said fuel stayed in said inner portion of said fuel chamber main body is inclined from flowing backward from said communicating hole; and
    a fuel storage recess portion provided between said upper end edge of said backward flow prevention portion and said communicating hole in a predetermined direction by setting a position of said communicating hole higher than said bottom surface portion of said fuel chamber main body.

18. A fuel chamber for an automotive vehicle according to claim 17, wherein said backward flow prevention portion is constituted by a backward flow prevention wall which is formed along a peripheral wall portion of said fuel chamber main body from a position at which said communicating hole is formed to the substantially opposite position within said fuel chamber main body and separates said inner portion of said chamber main body, a groove-like passage disposed along an inner surface of said peripheral wall portion of said fuel chamber main body, and a high position feeding portion having a front end portion disposed at a position higher than said bottom surface portion of said fuel chamber main body at the substantially opposite position within said fuel chamber main body from said position at which said communicating hole is formed in said groove-like passage, and wherein said fuel storage recess portion is formed by recessing at least a part of said groove-like passage between said communicating hole and said high position feeding portion.

19. A fuel chamber for an automotive vehicle according to claim 18, wherein said groove-like passage is formed in an inclined manner such as to be lower than said position at which said communicating hole is formed in the vicinity of said communicating hole and gradually increase a height toward said high position feeding portion from said communicating hole.

\* \* \* \* \*